(12) United States Patent
Chung

(10) Patent No.: US 8,962,202 B2
(45) Date of Patent: Feb. 24, 2015

(54) INTERNAL REFORMING TUBULAR SOLID OXIDE FUEL CELL STACK AND MANUFACTURING METHOD THEREFOR

(75) Inventor: Jong Shik Chung, Ulsan (KR)

(73) Assignee: Postech Academy-Industry Foundation, Gyungbuk (KR)

( * ) Notice: Subject to any disclaimer, the term of this patent is extended or adjusted under 35 U.S.C. 154(b) by 77 days.

(21) Appl. No.: 13/704,079

(22) PCT Filed: Jun. 9, 2011

(86) PCT No.: PCT/KR2011/004224
§ 371 (c)(1),
(2), (4) Date: Jan. 15, 2013

(87) PCT Pub. No.: WO2011/159064
PCT Pub. Date: Dec. 22, 2011

(65) Prior Publication Data
US 2013/0115537 A1 May 9, 2013

(30) Foreign Application Priority Data
Jun. 14, 2010 (KR) .................. 10-2010-0055965

(51) Int. Cl.
*H01M 8/06* (2006.01)
*H01M 8/12* (2006.01)

(52) U.S. Cl.
CPC .......... *H01M 8/0618* (2013.01); *H01M 8/0637* (2013.01); *H01M 2008/1293* (2013.01); *Y02E 60/525* (2013.01); *Y02E 60/50* (2013.01)
USPC ............................ 429/423; 429/497; 429/535

(58) Field of Classification Search
CPC ................ Y02E 60/50; Y02E 60/525; H02M 2008/1293; H02M 8/0618; H02M 8/0612; H02M 8/2425; H02M 8/0247; H02M 8/243

USPC .......................................... 429/423, 497, 535
See application file for complete search history.

(56) References Cited

U.S. PATENT DOCUMENTS 6,416,897 B1 7/2002 Tomlins et al.
6,429,051 B1 8/2002 Wood et al.
(Continued)

FOREIGN PATENT DOCUMENTS

JP 2003282107 A 10/2003
JP 2006172925 A 6/2006
(Continued)

OTHER PUBLICATIONS

PCT International Search Report, PCT/KR2011/004224 (mailed Feb. 27, 2012), 2 pages.

*Primary Examiner* — Stewart Fraser
(74) *Attorney, Agent, or Firm* — Thompson Hine LLP

(57) ABSTRACT

The present invention provides a large-scale solid oxide fuel cell stack and a method of manufacturing the stack. In the present invention, a segmented cell tube (103a, 103b) is formed in such a way that unit cells connected to each other are formed on a cylindrical or flat tubular porous support (101). A reformer tube (102) is configured such that reforming catalyst (3) is provided in a support (101). The cell tube and the reformer tube are disposed at positions spaced apart from each other such that an air passage is formed on the outer surface of the reformer tube. A cell module (105) is formed by arranging the tubes such that a fuel gas flow passage is formed between the tubes. The solid oxide fuel cell stack is formed by integrating cell modules with each other.

21 Claims, 11 Drawing Sheets

(56) References Cited

U.S. PATENT DOCUMENTS

| | | |
|---|---|---|
| 7,399,546 B2 | 7/2008 | Hart et al. |
| 7,914,939 B2 * | 3/2011 | Taylor et al. .................. 429/466 |
| 7,947,386 B2 * | 5/2011 | Chung et al. .................. 429/447 |
| 2007/0015015 A1 * | 1/2007 | Hoshino et al. ................. 429/19 |
| 2007/0134539 A1 * | 6/2007 | Chung et al. .................... 429/35 |
| 2007/0148523 A1 | 6/2007 | Brown et al. |
| 2009/0155660 A1 | 6/2009 | Yu et al. |
| 2010/0183929 A1 * | 7/2010 | Crumm et al. ................. 429/423 |
| 2010/0183930 A1 * | 7/2010 | Crumm et al. ................. 429/423 |
| 2012/0070762 A1 * | 3/2012 | Chung et al. .................. 429/467 |
| 2013/0130137 A1 * | 5/2013 | Chung .......................... 429/423 |

FOREIGN PATENT DOCUMENTS

| | | |
|---|---|---|
| KR | 10-2007-0077740 A | 7/2007 |
| KR | 10-2010-0052888 A | 5/2010 |
| WO | 2009/096624 A1 | 8/2009 |
| WO | 2009/123389 A1 | 10/2009 |

* cited by examiner

INTERNAL REFORMING TUBULAR SOLID OXIDE FUEL CELL STACK AND MANUFACTURING METHOD THEREFOR

RELATED APPLICATIONS

This application is a National Phase of co-pending International Application No. PCT/KR2011/004224 filed Jun. 9, 2011 which claims priority to Korean Patent Application No. KR 10-2010-0055965, filed Jun. 14, 2010.

TECHNICAL FIELD

The present invention relates, in general, to solid oxide fuel cell stacks in which hydrocarbon-containing gas can be directly used and, more particularly, to a solid oxide fuel cell stack which includes cell modules each of which includes a tubular reformer and a tubular reactor, and a method for manufacturing the solid oxide fuel cell stack.

BACKGROUND ART

Solid oxide fuel cells can have several advantages when they are operated at as high a temperature as possible. For example, the diversity in fuel use can be achieved, they can have MW-class capacity or more and thus be used in large-scale power plants, and high-temperature exhaust gas can be used to additionally generate power using a gas turbine. However, in the existing technology for manufacturing a solid oxide fuel cell, because of characteristics in which a unit cell is manufactured using a thin ceramic plate and a plastic process must be conducted at the final stage of the manufacturing process, it is difficult to significantly increase the area of the unit cell. Furthermore, there is no sealer that can be normally used at high temperature. In addition, because an electrical connector between unit cells made of ceramic is manufactured by stacking different kinds of metal plates one on top of another, problems of mechanical stress and high-temperature corrosion of metal are unavoidable. Given this, solid oxide fuel cells of only about 20 KW have been developed to date.

To avoid the use of such a metal electrical connector, a stack was proposed, which uses a segmented type cell integrated tube configured such that small unit cells are formed on a tubular support in the longitudinal direction and are electrically connected in series to each other by a conductive ceramic connector provided between the adjacent unit cells. This stack is advantageous in that the tubular support is made of inexpensive nonconductive ceramic rather than metal. However, because electric current flows in the longitudinal direction of an electrical connector, a conductive semiconductor and a cathode layer that have thin membrane structures, resistance is large, so that current density per unit area is low, and the conventional problems of electrical connection between the cell tubes still remain. Furthermore, it is impossible to three-dimensionally increase the size of the stack using small tubes. Moreover, the stack has no internal reformer so that if the size of the stack is increased, a problem of a temperature difference is caused, and it is not easy to control heat.

Solid oxide fuel cells (hereinafter referred to as SOFCs) are operated at high temperature ranging from 750° C. to 1,000° C. so that the efficiency is highest compared to those of other fuel cells. However, due to characteristics of a unit cell that must be formed of a thin ceramic plate and be processed through a plastic process, it is difficult to significantly increase the area of the unit cell. Furthermore, there is no sealer that can be normally operated at high temperature. In addition, between the unit cells made of ceramic, a gas channel and an electrical connection plate which functions to electrically connect the unit cells to each other are made of metal. Therefore, a problem of mechanical stress resulting from a hybrid stacking structure using metal and ceramic and a problem of high-temperature corrosion of metal are inevitable. Furthermore, planar unit cells are physically stacked one on top of another and are electrically connected only in series to each other. Thus, there is a problem in that if the performance of only one cell deteriorates, the performance of the entire stack also deteriorates. Hence, all the unit cells not only must be perfectly manufactured but the cell stacking structure for electrical connection must also be perfectly made and operated. However, the cell stack is sealed by a sealer, so even when only some of the cells malfunction, it is impossible to replace a portion of the stack with a new one or repair it. As such, although SOFCs can have several advantages when they are operated at as high a temperature as possible, for example, the diversity in fuel use can be achieved, they can have MW-class capacity or more and thus be used in large-scale power plants, and high-temperature exhaust gas can be used to additionally generate power using a gas turbine, the above-stated problems make it impossible to realistically make a unit cell having a large area of 400 $cm^2$ or more or a large size of stack of 20 KW or more.

Zirconium oxide that yttria is added thereto and has had its crystal structure stabilized has been used as electrolyte material of unit cells of such a SOFC. Although this material has conductivity with oxygen ions, only when it is within a high-temperature range from 750° C. to 1,000° C. can the conductivity which is required to function as the fuel cell be provided. Given this, the operating temperature of the SOFC is typically 750° C. or more, and conductive material which has high-temperature resistance is used as the material of the electrodes, for example, a cathode into which air is drawn is made of $LaSrMnO_3$, and an anode into which hydrogen is drawn is made of Ni—$ZrO_2$ compound (cermet). In planar type SOFCs, a unit cell is configured in such a way that the anode or electrolyte support is coated with the other electrode or electrolyte layer to eventually form a unit electrolyte-electrode assembly (hereinafter referred to as an 'EEA') having a thickness of 1 mm or less, and then the EEA is provided with an electrical connection plate which has channels for supply of fuel gas or air to upper and lower layers of EEAs when they are stacked one on top of another, and is made of conductive metal to make it possible to electrically connect the opposite electrodes of the EEA to each other. Such a planar type SOFC has an advantage in that the EEA layer is thin. However, because of the characteristics of ceramic, it is difficult to control the degree of uniformity in the thickness or the planarity so that the size of the SOFC cannot be easily increased. Furthermore, when ceramic EEAs and metal electrical connection plates are alternately stacked one on top of another to form a unit cell stacking structure, a sealer is applied to the peripheries of the cells to realize a sealing structure for fuel gas and air between the cells. However, typically, the lowest softening temperature of glass-based material which is used as sealing material is about 600° C., but the SOFC must be operated at a higher temperature of 750° C. or more to obtain the satisfactory efficiency. Therefore, there is the possibility of leakage of gas resulting from the sealer softening. Moreover, because the stack is configured such that the unit cells are electrically connected only in series to each other, all the unit cells must be perfectly operated without any defect. The above-stated technical problems have made it difficult to commercialize the SOFC up to now.

To compensate for the disadvantages of the planar type cell, techniques that pertain to unit cells and stacks using flat tubular supports were proposed in U.S. Pat. Nos. 6,416,897 and 6,429,051. However, in these cases, additional gas channels for supply of gas to the cathode or anode and metal electrical connection plates must be provided on outer surfaces of flat tubular cells when a stacking structure is formed. This flat tubular structure can increase the mechanical strength of a cell stack, but because of characteristics such as the electrical connection plate being made of metal, when the cell stack is operated at high temperature, mechanical and thermal stress is caused between EEA layers made of ceramic. Moreover, the cells are connected only in series to each other, so a burden of zero-defect manufacture is still present.

In an effort to overcome the above-mentioned problems of the conventional SOFCs, a segmented type cell tube was proposed. The segmented type cell tube is configured in such a way that small units, each of which includes an anode, an electrolyte, and a cathode, are applied to the tube at positions spaced apart from each other in the longitudinal direction of the tube at regular intervals, and the cathode of each unit cell is electrically connected to the anode of the adjacent unit cell by an electrical connector. The segmented type cell tube is characterized in that depending on the number of cells connected in series to each other on the tube, the output voltage can be adjusted. Therefore, the output voltage of the segmented type cell tube can be greater than that of the typical flat tubular type, despite the fact that the segmented type cell tube does not have a physical stacking structure. Further, nonconductive material such as alumina which is inexpensive can be used as a support of the tube. However, because current flows in the longitudinal direction of the unit cells and electrical connectors that have thin membrane structures, resistance is increased so that power density is reduced. In addition, to form additional air or fuel gas channels, tubes must be arranged or stacked one on top of another at positions spaced apart from each other. In this case, it is difficult to electrically connect the tubes to each other.

In detail, in the segmented type fuel cell using the tubular support, if the unit cells are manufactured to form a cathode-supported type structure, air is supplied into the tube while fuel is supplied to space defined around the tube. Therefore, due to the reducing atmosphere around the tube, general metal material can be used as the material of the electrical connectors. The mechanical characteristics and high-temperature stability of the cathode-supported type tube are very superior, but electrical resistance in the cells is high so that output loss is increased. Thus, actual electrical output is typically 200 mW/cm$^2$, in other words, comparatively low, and the production cost is high. On the other hand, in the case of an anode-supported type, fuel and air can be supplied in a manner opposite to that of the cathode-supported type. However, this case has a problem of corrosion of electrical connectors disposed outside the tube. In the case of the tubular type, it is also difficult to electrically connect tubes to each other. A method in which the tubular cell tubes are electrically connected to each other using wires or the like was proposed in US 2007/0148523 A1.

To mitigate the problems of such a tubular type structure, flat tube segmented type structures in which unit cells are arranged on a flat tube in the longitudinal direction in the same manner as that of the tubular type structure were proposed in U.S. Pat. No. 7,399,546 B2, JP 2006-172925 A, etc. A method of installing flat tube segmented type cell module tubes in a stacking manner is as follows. In the same manner as that of the typical flat tube type structure, cells may be provided on a cell or stack installation port using different kinds of components or the like and then it may be sealed by glass or the like (in JP 2003-282107 A), or alternatively, they may be directly connected to each other by brazing without using components (in JP 2006-172925 A). In such segmented type structures, although electrical connection between the segmented cells was illustrated as being realized by applying an internal connection layer made of $LaCro_3$ or the like to the tube, there was no method of solving a problem of a reduction of the efficiency resulting from an increase in resistance that is caused in the structure in which the thin membrane is applied to the tube to form the electrical connector. Further, there was no method of providing electricity from the cell tube in which segmented unit cells are arranged or stacked. In the same manner as the typical flat tube type structure, even if an electrical connector is attached to one side of the cell module and the cell modules are connected in parallel or series to each other, when it is operated at a high temperature of 700° C. or more for a long time of period, deformation in the shape of the cells may reduce the contactability between the cell modules and metal electrical connectors. Moreover, problems of oxidation corrosion of the metal electrical connectors, an increased in resistance, etc. still remain.

DISCLOSURE

Technical Problem

Accordingly, the present invention has been made keeping in mind the above problems occurring in the prior art, and an object of the present invention is to provide a cell tube in which segmented unit cells are connected in series to each other in a longitudinal direction of the tube and which is configured such that the power density is high and the process of electrically connecting the unit cells to each other is facilitated, and a method of manufacturing the cell tube.

Another object of the present invention is to provide a unit cell structure and a structure for connecting unit cells to each other which can increase the power density.

A further object of the present invention is to provide an integrated cell module which is configured such that reforming reaction of hydrocarbon-containing gas is processed in the cell module so that heat generation can be controlled, and a method of manufacturing the integrated cell module.

Yet another object of the present invention is to provide a large solid oxide fuel cell stack in which integrated cell modules, each of which is configured such that reforming reaction of hydrocarbon-containing gas is processed in the cell module so that heat generation can be controlled, are integrated with each other, and a method of manufacturing the large solid oxide fuel cell stack.

Still another object of the present invention is to provide a stack which can solve the problems of the conventional segmented-cell type tubular solid oxide fuel cell in which segmented unit cells are arranged in the longitudinal direction, for example, a problem of low power density, a problem caused in electrical connection between cell modules, a problem of corrosion due to air, a problem of an excessive increase in size caused by integration, a problem of difficulty on partial repair of a large stack, etc., and which can be manufactured in a large scale using small unit cells of 100~200 cm$^2$, thus making it possible to produce a MW-class stack, and a method of manufacturing the stack.

Technical Solution

In order to accomplish the above objects, in an aspect, the present invention provides an internal reforming solid oxide fuel cell stack, including cell modules integrated with each other, each of the cell modules having: a tubular reformer having at least first opening formed in an outer surface of the tubular reformer, the first opening communicating with an internal channel; and at least one tubular reactor having at least second opening formed in an outer surface of the tubular reactor, the second opening communicating with an internal channel, with a reaction part formed in the tubular reactor, the reaction part comprising unit cells connected in series to each other, wherein an air passage is formed in an outer surface of the tubular reactor, and the first opening and the second opening are connected to each other so that gas that is reformed by the tubular reformer is drawn into the reactor.

Preferably, the tubular reformer and the tubular reactor may be spaced apart from each other by spacers and stacked one on top of another, and the first opening and the second opening may communicate with each other through a passage formed between the spacers. The first opening and the second opening may be formed between the sealed spacers.

The cell module may be configured such that the tubular reformer and the tubular reactor are stacked one on top of another and parallel to each other, and a vertical channel may be formed in the cell module so that the first opening and second opening are connected to each other by the vertical channel.

The tubular reformer may have inlets on opposite ends thereof, wherein one of the inlets of the tubular reformer may be closed, and the first opening may be formed adjacent to the closed inlet of the tubular reformer, and the tubular reactor may have inlets on opposite ends thereof, wherein one of the inlets of the tubular reactor may be closed, and the second opening may be formed adjacent to the closed inlet of the tubular reactor.

In each unit cell of the reaction part, the cathode may be formed to be thick, and the electrical connector may be oriented in a direction perpendicular to the direction in which electric current flows through the entire tube. For example, anode layers, electrolyte layers, cathode layers and electrical connector layers may be connected to each other and repeatedly formed on a surface of the reaction part. Each of the cathode layers may be formed on at least a portion of the electrolyte layer while the corresponding anode layer is formed under at least a portion of the electrolyte layer, thus forming the single unit cell, wherein a portion of the cathode layer may be perpendicularly connected to the electrical connector layer, and the anode layer may be connected in series to the electrical connector layer of the adjacent unit cell. Preferably, among elements constituting the unit cell, the cathode layer is thickest.

The reaction part may be formed in a medial portion of the outer surface of the tubular reactor. Electrical connectors may be formed to be thick on the opposite sides of the outer surface of the reactor and be respectively connected to the anode and cathode disposed on left and right ends of the reaction part. The electrical connectors that are formed on the opposite sides of the outer surface of the reactor may be connected to ring-shaped electrical connectors which are provided on the opposite ends of the outer surface of the reactor, whereby they can be connected to the outside.

The cell module may comprise a plurality of cell modules. The cell modules may form a cell bundle in which fuel gas manifolds are coupled both to inlets of the tubular reformers of the cell modules and to outlets of the tubular reactors of the cell modules. A plurality of cell bundles may be arranged in parallel to each other, thus forming a stack module in which an air manifold is formed so that air is supplied into the air passage. A plurality of stack modules are connected and/or stacked one on top of another, thus forming a large-sized stack which is expanded three-dimensionally.

In another aspect, the present invention provides a method of manufacturing a solid oxide fuel cell stack, including: forming a reformer tube by forming a porous tubular support having at least one fuel gas channel formed in a longitudinal direction, closing one end of the internal channel of the support, forming a vertical passage in the support at a position adjacent to the closed end, the vertical passage communicating the internal channel with an outside of the tube, applying a dense membrane ceramic layer to an inner and outer surface of the tube, and providing a reforming catalyst in the internal channel; manufacturing a segmented type cell tube in which unit cells are repeatedly formed in a medial portion of an outer surface of the tubular support in a longitudinal direction such that opposite poles of the unit cells are electrically connected in series to each other, electrical connectors are connected to a cathode and anode of the unit cells disposed on the opposite ends of the tube and extend the electrical connectors to the corresponding ends of the tube, at least one end of an internal channel is closed, and a vertical passage is formed in the tube at a position adjacent to the closed end, the vertical passage communicating the internal channel with an outside of the tube; and forming a cell module by integrating an even number of cell tubes on upper and lower sides or upper, lower, left and right sides of each reformer tube, wherein a spacer made of ceramic material is fitted over some of the electrolyte layers of the integrated cell part, an insulator is disposed beside each of the unit cells adjacent to the ends of the tube, a sealing spacer made of a combination of three members having a ceramic substance, a sealer, a ceramic substance is disposed at each of opposite left and right sides of each of the vertical passages, and a metal electrical connector is fitted over each of the opposite ends of the tube.

The method of manufacturing the solid oxide fuel cell stack may further include forming a cell bundle by closely arranging a plurality of cell modules upward, downward, leftward and rightward, and mounting a fuel gas inlet manifold and a reaction gas outlet manifold on respective opposite ends of the cell bundle in such a way that the fuel gas inlet and reaction gas outlet manifolds are connected to the electrical connectors provided on the ends of the tubes; melting the sealers so that a fuel gas flow connection chamber is formed by the vertical passages and by space between the left and right sealers, thus completing the cell bundle; forming a stack module by arranging a plurality of cell bundles upward, downward, leftward and rightward at positions spaced apart from each other at predetermined intervals such that the cell bundles are prevented from being electrically connected to each other, wherein a central reaction part of the stack module is installed in a hot box, and the fuel gas manifolds are supported on racks disposed outside the hot box, and the stack module comprises a plurality of stack modules; forming a stack bundle by connecting the stack modules to each other in such a way that air manifolds of the stack modules are connected to each other on the hot boxes and the fuel gas manifolds of the stack modules are connected to each other on the ends of the tubes, wherein the stack bundle is able to be two-dimensionally expanded in size and comprises a plurality of stack bundles; and forming a final stack by closely arranging the stack bundles upward and downward, wherein the final stack is able to be three-dimensionally expanded in size.

Preferably, the ceramic material applied to the inner and outer surface of the reformer that is manufactured using the porous support may be prevented from being activated by a reforming reaction of hydrocarbon, and the dense membrane may be formed by sintering at temperature lower than a temperature at which the support is sintered, or the support may be manufactured without any pore.

In an embodiment of the present invention, a catalyst may be provided in the reformer. Preferably, the catalyst may be provided in the reformer in such a way that it is applied to an inner surface of the channel so as to reduce pressure loss. The reformer may be configured such that a reforming reaction rate is appropriately controlled in proportion to a heating value with respect to the longitudinal direction of the adjacent cell tubes in such a way as to adjust the composition of the catalyst or the amount of catalyst, thus reducing temperature deviation with respect to the longitudinal direction of the cell module.

The integrated unit cell part in which the unit cells are repeatedly formed on the reaction part of the support tube in the longitudinal direction may be formed in such a way that depressions are formed in the tube at positions spaced apart from each other at regular intervals by primarily grinding portions of the tube to predetermined length and depth; the anode layer is applied to the depressions; a left portion of a part that has not been ground during the primary grinding process is secondarily ground vertically to a predetermined depth to remove portions of the anode layer; an electrolyte layer is applied to the entire portion; the left vertical portions that have not been ground are tertiarily ground to remove the corresponding portions of the electrolyte layer so that the anode layer is exposed to the outside; an electrical connector layer is applied to each ground portion so that the electrical connector layer is oriented in a direction perpendicular to the longitudinal direction and is connected to the corresponding anode layer; and a cathode layer is applied thereto such that it is charged into each depression that has been formed to a predetermined depth during the primary grinding process, so that the cathode layer is formed to be sufficiently thick and is connected to the corresponding electrical connector that is connected to the anode layer of the adjacent unit cell. After the support tube has been initially formed or the coating process has been completed, it is temporarily sintered in a temperature range lower than that of a final sintering process, preferably, in a range from 200° C. to 400° C., so that the grinding processes can be more easily conducted. In detail, the length of each of the unit cells that are longitudinally repeatedly formed in the support tube ranges from 5 mm to 50 mm, the distance between the adjacent unit cells is 10 mm or less, and the depth of the ground portion of each unit cell ranges from 0.1 mm to 5 mm. As such, after a primary grinding process is completed, the anode layer is applied to an entire portion of the integrated cell part to a sufficient thickness and temporarily sintered, a portion of a part that has not been ground during the primary grinding process is secondarily ground to remove a portion of the anode layer, an electrolyte layer is applied to the entire portion and temporarily sintered, a portion of a side portion that has not been ground is tertiarily ground such that the anode layer and the support are exposed with respect to a direction perpendicular to the longitudinal direction, an electrical connector layer is applied to the exposed portion and sintered at high temperature so that the electrical connector layer along with the electrolyte is formed into a dense membrane, and a cathode material is charged into the depressions formed by the primary grinding process such that the cathode material is connected to the electrical connector layer and then sintered, thus completing the integrated part in which the unit cells are connected to each other in series.

The anode layer may be formed in such a way that a metal layer or high metal content functional layer that is higher in conductivity than the anode layer is applied to the tube before the anode layer is applied on the metal layer or functional layer, whereby an electrical resistance of the anode layer is reduced.

In a further aspect, the present invention provides a cell module for a solid oxide fuel cell, including: a tubular reformer having at least first opening formed in an outer surface of the tubular reformer, the first opening communicating with an internal channel; and at least one tubular reactor having at least second opening formed in an outer surface of the tubular reactor, the second opening communicating with an internal channel, with a reaction part formed in the tubular reactor, the reaction part comprising unit cells connected in series to each other, wherein an air passage is formed in an outer surface of the tubular reactor, and the first opening and the second opening are connected to each other so that gas that is reformed by the tubular reformer is drawn into the reactor.

In yet another aspect, the present invention provides a tubular reactor for a solid oxide fuel cell, including a reaction part having unit cells formed on a surface of a tubular support in a longitudinal direction at positions spaced apart from each other at regular intervals, the unit cells being connected in series to each other by an electrical connector, each of the unit cells comprising a cathode, an electrolyte and an anode, wherein in each of the unit cells, the cathode layer is formed in a cut out depression formed in the outer surface of the support so that a cathode layer is thick, and the electrical connector is configured such that electric current flows in a direction perpendicular to a thin film of the electrical connector.

The reaction part may be configured such that unit cells, each of which is formed by stacking an anode layer, an electrolyte layer and a cathode layer, are formed on the surface of the unit cell at positions spaced apart from each other at regular intervals, and the cathode layer of each unit cell is connected to the anode layer of the adjacent unit cell by the corresponding electrical connector. The reaction part may be formed in a medial portion of the outer surface of the tubular reactor, and electrical connectors may be formed on respective opposite ends of the tubular reactor and respectively connected to the corresponding anode and cathode disposed on opposite ends of the reaction part.

The present invention will be described in more detail.

In order to accomplish the above objects, a plurality of internal reforming cell modules are integrated with each other. Each cell module is manufactured by the following method. A segmented cell integrated tube (hereinafter, referred to as a 'cell tube') which is manufactured in such a way that a cathode layer is formed to be thick on a tubular support and a ceramic electrical connector is oriented such that electric current flows in a direction perpendicular to the thin film of the ceramic electrical connector so as to reduce resistance. The cell tube is combined with a reformer tube. The combined cell tubes and reformer tubes are arranged. A fuel gas passage is formed on each of opposite ends or one end of the combined and arranged tube structure in such a way that a fuel gas passing hole or common chamber is formed between the tubes.

In the present invention, a plurality of cell bundles are formed. Each cell bundle is formed in such a way that a predetermined number of cell modules are integrated with each other, and a fuel gas inlet manifold and a fuel gas outlet manifold are mounted to the opposite ends of the cell bundle such that the manifolds are connected to end electrodes of the tubes disposed on the opposite ends of the integrated cell modules. The cell bundles are repeatedly arranged upward, downward, leftward and rightward, and a hot box to which an air manifold is attached is installed in the central portion of the tubes, thus forming a stack module. A plurality of stack modules are connected to each other such that their fuel gas manifolds are connected to each other and the air manifolds are connected to each other, thus forming a two-dimensional stack bundle. A plurality of stack bundles are vertically stacked one on top of another, thus eventually a three-dimensional solid oxide fuel cell stack.

In the solid oxide fuel cell stack according to the present invention, electrical series-parallel combined connection can be realized between the cell tubes, between the cell bundles or between the stack modules. Air is drawn into the hot box and flows to shell sides of the individual tubes, while hydrocarbon-containing gas is drawn into the reformer through the fuel gas manifold disposed outside the hot box and then reformed into hydrogen-containing gas, then passing through internal channels of the tubes provided with the unit cells before being discharged to the outside through the fuel gas manifold that is disposed at the opposite side. Therefore, the sealing process can be facilitated, and heat control can be precisely performed using the internal reformer. Further, it is easy to increase the size of the stack. Each cell bundle can be replaced with a new one, thus making it possible to partially repair the stack.

Furthermore, the present invention provides an internal reforming large-scale stack and a method of manufacturing the same. For this, a segmented cell tube is formed in such a way that at least one fuel gas channel is formed in a tubular support, a cathode layer is formed to be thick, and an electrical connector layer is oriented in a direction perpendicular to the direction in which electric current flows. A reformer tube in which hydrocarbon reforming catalyst is provided in its internal channel is provided. A vertical passage is formed in each of the opposite ends or one end of each tube. The vertical passage is connected to the internal channel and communicates with the outside. Two cell tubes are arranged on each of upper and lower sides or upper, lower, left and right sides of each reformer tube such that the vertical passages face each other. The tubes are supported by a rectangular support plate having a plurality of tube mounting holes or by rectangular rings each of which can support a single tube. Here, a ceramic support plate or ring for enhancing mechanical strength between the tubes is provided on the electrolyte layer portions of some unit cells disposed at the central portion of the stack. An insulation support plate or ring which blocks heat from the hot box disposed in the central portion of the stack is provided beside the unit cells disposed on the opposite ends of the stack. Thereafter, three kinds of support plates or rings formed of a combination of a ceramic member, sealer and a ceramic member are provided on each of the opposite sides of each vertical passage. A metal electrical connector support plate or ring is provided on each of the opposite ends of the tubes.

The cell modules are closely arranged, and fuel gas manifolds are provided on the opposite ends of the cell modules and are connected to electrical connectors disposed on opposite ends of the tubes, thus forming a cell bundle.

A plurality of cell bundles are arranged, wherein a hot box is provided in a central portion of the arranged cell bundles, and manifold support racks are provided on opposite ends of the hot box, thus forming a stack module.

Thereafter, a stack bundle is manufactured by two-dimensionally connecting stack modules to each other in such a way that the air manifolds of the stack modules are connected to each other and the fuel gas manifolds of the stack modules are connected to each other. Subsequently, stack bundles are vertically stacked one on top of another, thus completing the final fuel cell stack. In this way, the final fuel cell stack can be indefinitely expanded in size three-dimensionally.

In the present invention, the fuel gas manifolds which are disposed on the opposite ends of the cell bundles of the stack are exposed to an open chamber of hydrogen gas reducing atmosphere, so that external electrical connection can be easily realized, and they can be connected in series, parallel or series-parallel combination. Therefore, despite using small tubes, a reaction area can be increased by connecting the tubes in parallel to each other. In addition, a high voltage structure can be realized by connecting the tubes in series. The cell tubes which are electrically connected in parallel to each other in the cell bundle can be easily manufactured because zero-defect manufacturing is not required. Furthermore, each of the cell bundles which are supported on the racks can be easily replaced with a new one, thus making maintenance or repair easy.

In the internal reforming stack according to the present invention, sealer in the tubes are disposed outside the hot box and cooled, thus solving the conventional problem of sealer being melted. Further, the sealing can be satisfactorily realized in such a way that after the stack is placed upright in the longitudinal direction of the tubes, melted sealer spreads between the tubes. Because the present invention has an indirect internal reforming structure using the separate reforming tube, different kinds of fuel gases can be directly used depending on the kind of reforming catalyst. The fuel gas inlet manifold and the fuel gas outlet manifold can be used as an internal manifold on the cell bundle, an external manifold integrated into the stack module, or an external manifold integrated into the final stack. Hydrocarbon-containing gas which is drawn into the manifold is always supplied into the internal channels of the individual reformers and is reformed into hydrogen-containing gas. The hydrogen-containing gas passes through the internal channels of the cell tubes in the cell module in a zigzag manner before being discharged to the outside through the manifold that is disposed at the opposite side. Therefore, the manifolds can be integrated or connected to each other, thus making it possible to produce a large-scale fuel cell stack. Air is drawn into the manifold on the hot box that is disposed in a medial portion of the stack module and flows through shell sides of the individual tubes before being discharged to the outside through the outlet manifold. Therefore, a problem of fuel gas being mixed with air is not caused. The air manifolds in the fuel cell stack can be easily integrated or connected to each other so that the three-dimensional size of the final fuel cell stack can be easily increased. In the case of the large-scale fuel cell stack, the reformers which are evenly distributed in the stack cause a heat absorption reforming reaction, thus absorbing heat of the exothermic reaction of the fuel cell, thereby reducing a heat difference depending on the position in the tubes or in the cell bundles. Therefore, the heat control of the entire fuel cell stack can be more precisely performed. The cell bundles which are supported on the left and right racks while passing through the hot box can be easily individually removed or installed, so that each cell bundle can be replaced with a new one, thus making it possible to partially repair of the entire stack. The present invention also provides a method of manufacturing the solid oxide fuel cell stack.

The method of manufacturing the solid oxide fuel cell stack according to the present invention includes:

forming a reformer tube in such a way that a ceramic dense membrane is formed on inner and outer surfaces of a porous tubular support having at least one fuel gas channel by coating and sintering, or a nonporous support is used, a hydrocarbon reforming catalyst is provided in the internal channel of the support, one end of the internal channel is closed, and a vertical passage is formed in the support at a position adjacent to the closed end of the internal channel by boring or the like;

forming a segmented cell integrated tube (hereinafter, referred to as a 'cell tube') in such a way that unit cells each of which includes an anode layer, an electrolyte layer, a cathode layer and an electrical connector layer are repeatedly formed in a medial portion of the support by grinding and coating, wherein the cathode layer is formed to be sufficiently thick in each of the depressions formed by grinding, the electrical connector layer is applied to a vertical side surface of the depression formed by grinding so that the anode layer and cathode layer of the adjacent unit cells are connected to each other in a direction perpendicular to the longitudinal direction, thus reducing electrical resistance, and thereafter electrical connectors extend from the outermost unit cells to the opposite ends of the tube, one end or opposite ends of the internal channel is closed, and then a vertical passage is formed in the tube at a position adjacent to the closed end;

forming a cell module in such a way that an even number of cell tubes are arranged on upper and lower sides or upper, lower, left and right sides of each reformer tube such that the vertical passages face each other, and the tubes are supported by a rectangular support plate having a plurality of tube mounting holes or by rectangular rings each of which can support a single tube, wherein a ceramic support plate or ring for enhancing mechanical strength between the tubes is provided on the electrolyte layer portions of some unit cells disposed at the central portion of the stack, an insulation support plate or ring which blocks heat from the hot box disposed in the central portion of the stack is provided beside the unit cells disposed on the opposite ends of the stack, three kinds of support plates or rings formed of a combination of a ceramic member, a sealer and a ceramic member are provided on each of the opposite sides of each vertical passage, and a metal electrical connector support plate or ring is provided on each of the opposite ends of the tubes, wherein the support plate may be used intact or a plurality of support plates may be arranged;

forming a cell bundle in such a way that cell modules are closely arranged upward and downward or upward, downward, leftward and rightward, fuel gas manifolds are mounted to opposite ends of the tubes such that the fuel gas manifolds are connected to electrical connectors disposed on the opposite ends of the tubes, the sealer evenly spreads into spaces defined by the ceramic support plates or rings between the tubes and between the cell bundle and inner surfaces of the manifolds without leaking out in such a way that the entire cell bundle is placed upright and the sealer is melted at high temperature, whereby fuel gas flow chamber including the vertical passages is eventually defined between the left and right sealers;

forming a stack module by arranging a predetermined number of cell bundles upward, downward, leftward and rightward at positions spaced apart from each other at regular intervals such that they are prevented from being electrically connected to each other, wherein the medial portion of the stack module is disposed in the hot box, and the fuel gas manifolds provided on the opposite ends of the stack module are disposed on the racks provided outside the hot box;

forming a stack bundle by connecting a plurality of stack modules in such a way that air manifolds are connected to each other in the hot box and then the fuel gas manifolds are connected to each other; and forming a final stack by arranging stack bundles upward and downward so that the stack can be indefinitely expanded three-dimensionally.

In the present invention, the support is formed in a tubular shape using nonconductive material. The support can have a variety of cross-sections, for example, a circular, rectangular or other polygonal cross-section. At least one fuel gas flow channel is longitudinally formed in the tube. An air flow channel are formed by space defined between the tube shells when the tubes are arranged upward, downward, leftward and rightward at positions spaced apart from each other.

In the present invention, the forming of the reformer includes applying ceramic material, preferably, electrolyte material, to the inner and outer surfaces of the reformer and sintering it, thus forming a dense membrane layer or manufacturing a nonporous tube; providing the hydrocarbon reforming catalyst in the internal channel by coating or the like; closing the one end of the internal channel; and forming the vertical passage at a position adjacent to the closed end by boring or the like so that the internal channel is connected to the outer surface of the tube by the vertical passage.

The method of manufacturing a segmented cell tube which includes a support and unit cells which are formed on the support and connected in series to each other will be explained in detail. The unit cells each of which includes the anode layer, the electrolyte layer, the cathode layer and the electrical connector layer are repeatedly formed in the medial portion of the support and are connected to each other such that opposite poles are connected to each other by the electrical connectors. In detail, depressions are formed in the tube at positions spaced apart from each other at regular intervals by primarily grinding portions of the tube to a predetermined length and depth. The anode layer is applied to the depressions. A portion (for example, a left portion of the protrusion) of a part that has not been ground during the primary grinding process is secondarily ground vertically to remove portions of the anode layer. An electrolyte layer is applied to the entire portion. The left vertical portions that have not been ground are tertiarily ground to remove the corresponding portions of the electrolyte layer so that the anode layer is exposed to the outside. An electrical connector layer is applied to each ground portion so that the electrical connector layer overlaps the electrolyte layers of the left and right unit cells. A cathode layer is charged into each depression that has been formed to a predetermined depth during the primary grinding process, so that the cathode layer is formed to be sufficiently thick and is connected to the electrical connector layer of the right unit cell. As such, because the cathode layer of each cell tube is thick, the electrical resistance can be reduced. Furthermore, because the electrical connector is oriented such that electric current flows in a direction perpendicular to the longitudinal direction of the tube, the electrical resistance can be further reduced. Finally, one end or each of opposite ends of the tube is closed, and a vertical passage that communicates the internal channel with the outside is formed at a position adjacent to the closed end by boring or the like, thus completing the cell tube.

A method of manufacturing a unit cell module using a combination of a cell tube and reformer according to the present invention will be described. An even number of cell tubes are arranged at regular intervals on upper and lower sides or upper, lower, left and right sides of each reformer tube in such a way that the vertical passages between the reformer and cell tubes face each other. The tubes are supported by a rectangular support plate having a plurality of tube mounting holes or by rectangular rings, each of which can support a single tube. Here, a ceramic support plate or ring for enhancing mechanical strength between the tubes is provided on the electrolyte layer portions of some unit cells disposed at the central portion of the stack. An insulation support plate or ring which blocks heat from the hot box disposed in the central portion of the stack is provided beside the unit cells disposed on the opposite ends of the stack. Thereafter, three kinds of support plates or rings formed of a combination of a ceramic member, sealer and a ceramic member are provided on each of the opposite sides of each vertical passage. A metal electrical connector support plate or ring is provided on each of the opposite ends of the tubes. In the case of the support plate, it may be used intact or a plurality of support plates may be arranged. The cell module is sealed between the tubes in such a way that after a cell bundle is formed of a plurality of cell modules, the cell bundle is placed upright and then sealer is melted. After the sealing is completed, the fuel gas flow chamber which includes the vertical passages and is insulated from the outside is eventually defined between the left and right sealers. The fuel gas flow chamber functions to make the flow of fuel gas through the vertical passages between the tubes possible. Hydrocarbon-containing gas drawn into the inlet of the reformer tube is reformed into hydrogen-containing gas by the catalyst provided in the internal channel, passes through the outlet side vertical passage of the reformer, is supplied into an adjacent cell through the vertical passage thereof, passes through the internal channel of the adjacent cell, and then is drawn into a subsequent adjacent cell through the vertical passage thereof. As such, gas flows through the tubes along the longitudinal direction of the tubes in a zigzag manner and is eventually discharged to the outside through an outlet side of the reformer that is opposite to the inlet.

A method of integrating a plurality of cell modules upward and downward or upward, downward, leftward and rightward and forming a cell bundle having a predetermined size according to the present invention will be described in detail. A predetermined number of cell modules are closely arranged, and fuel gas manifolds are mounted to the opposite ends of the arranged cell modules in such a way that the fuel gas manifolds are connected to the electrical connectors disposed on the opposite ends of the tubes. After the electrical connection has been completed, the entire cell bundle is placed upright, and sealer is melted into liquid form at high temperature so that melted sealer is charged into space between the tubes and between the cell bundle and the inner surfaces of the manifolds, thus sealing the entire cell bundle.

In an embodiment of the present invention, to reliably seal the cell bundle using the sealer, a ceramic support plate or ring is provided under the sealer to prevent the melted sealer from leaking out downwards when the sealer is melted after the cell bundle is placed upright. Here, preferably, when the tubes are installed or closely arranged, ceramic paste or adhesive is applied between gap between the ceramic support plate or ring and the tubes so that there is no gap in a lower ceramic support part.

A method of arranging a plurality of cell bundles and forming a stack module having a predetermined size according to the present invention will be described in detail. A hot box to which the cell bundles are mounted is placed in a medial portion of the stack module. Racks on which the cell bundles are supported are placed on the left and right sides of the hot box, so that the cell bundles are arranged parallel to each other on the racks at regular intervals. For this, the hot box is open on the left and right sidewalls thereof with respect to the longitudinal direction, and air inlet and outlet manifolds are mounted to the front and rear surfaces of the hot box. Each rack is manufactured in such a way that boxes each of which has a double wall structure and is open on at least left and right sides thereof are arranged at regular intervals. Subsequently, an insulation plate having a predetermined thickness, preferably, 10 mm or less, more preferably, 5 mm or less, is installed the bottom of each open box across the hot box. Each cell bundle is installed on the insulation plate of the corresponding open box across the hot box in the same manner as that of the insulation plate. An insulation plate is put into space between the upper surface of each cell bundle and the corresponding open box. Finally, insulation plugs are interposed between the manifolds disposed on the opposite ends of the cell bundles and the open boxes at positions corresponding to the left and right sidewalls of the hot box, thus blocking heat from the hot box. The insulation plates or insulation plugs function not only to block heat from the hot box but also to block electrical connection between the cell bundles and the racks. Particularly, the insulation plates function to prevent air from excessively leaking out through gaps between the adjacent upper and lower cell bundles in the hot box.

In the present invention, front and rear walls of the hot box into and from which air of the stack module is drawn and discharged comprise thick walls in which small air flow holes are evenly formed, so that heat can be effectively blocked. As necessary, at least one additional perforated plate in which small holes are randomly formed is provided on each of the front and rear walls of the hot box. Finally, air inlet and outlet manifolds are installed. Thus, heat can be effectively blocked from being emitted from the hot box to the outside of the manifolds. Furthermore, the flow of air drawn into pipes can be effectively dispersed.

In the present invention, if a rectangular ring-shaped ceramic plug is additionally plugged into the gap between each open box of the racks of the stack module and the corresponding manifold, an air chamber through which air is supplied between the manifolds in the open boxes can be formed. When necessary, air can be supplied into the chamber to control the temperature of the fuel gas manifolds, in detail, the temperature of the sealer in the manifolds.

In the present invention, preferably, when a stack bundle which two-dimensionally expands is manufactured by connecting the fuel gas manifolds of the stack modules to each other and connecting the air manifolds of the stack modules to each other, one of the manifold connection chambers by which the fuel gas inlet or outlet manifolds are connected is longer than the cell tubes, whereby as necessary, the cell bundles can be easily pulled out of the stack bundle or inserted thereinto.

In an embodiment of the present invention, the fuel gas or air manifolds in the stack bundles or the manifold connection chambers may be integrated with each other between the upper and lower stack bundles, thus forming a single integrated manifold or integrated connection chamber. In addition, the fuel gas manifolds that are provided on the opposite ends of the tubes with respect to the longitudinal direction may also be configured such that the adjacent fuel gas manifolds are integrated with each other.

In a solid oxide fuel cell stack according to an embodiment of the present invention, a single unit stack module can be used as the smallest stack. Alternatively, a medium-sized stack may be configured in such a way that a plurality of unit stack modules are connected in series to each other in the direction in which air flows and then are closely arranged upward and downward. As a further alternative, the final stack may be configured such that structures, each of which only two stack modules are connected to in the direction in which fuel gas flows, are connected in series in the direction in which air flows, and then arranged upward and downward.

In an embodiment of the present invention, with regard to the series connection between the air inlet and outlet manifolds of the stack modules of the solid oxide fuel cell stack, when oxygen concentration in exhaust air is reduced to a level which is not suitable to use it as supply air, preferably, when the oxygen concentration is 5% or less, the series connection is interrupted, and the inlet and outlet manifolds of the series-connected units are successively connected to each other so that air can be dispersed when it is drawn, thus preventing a reduction of air concentration, and making it possible to increase the size of the stack.

In an embodiment of the present invention, the solid oxide fuel cell stack is oriented such that the tubes are placed upright. Thus, the temperature at which the stack is operated can be maintained within a high-temperature range, that is, 700° C. or more, in which glass-containing sealer in the fuel gas manifolds is melted.

In an embodiment of the present invention, to precisely control heat, an additional small reformer may be installed outside the stack. The heat control can be more effectively performed by adjusting a reforming ratio between the external reformer and the internal reformer.

In an embodiment of the present invention, a catalyst is provided in the internal channel of the reformer in such a way that the composition or amount of catalyst varies from a first end thereof to a second end thereof with respect to the longitudinal direction of the reformer so that the internal reforming can be gradually conducted, whereby the temperature distribution in the adjacent cell tubes can be more evenly controlled.

Advantageous Effects

A segmented cell tubular solid oxide fuel cell stack according to the present invention has the following effects. First, unit cells are formed on a cell tube through a grinding-coating combination process in which portions of a support are depressed by grinding to a predetermined depth and then coating operation is conducted. Thus, an electrical connector can be formed in a direction perpendicular to the longitudinal direction of the tube, and a cathode can be formed to be thick in such a way that the depression formed by grinding is filled with material of the cathode. Therefore, electrical resistance can be reduced, and the performance of cells is markedly improved compared to the conventional segmented cell structure. Second, after an internal reformer tube is manufactured using a support having the same structure as that of the support of the cell tube, the internal reformer tube is combined with the cell tube. Thereafter, fuel gas chambers are formed on the opposite ends of the tubes, and fuel gas connection passages are formed between the tubes. Thus, gas that has been reformed in the reformer tube is supplied to the adjacent cell tube. Hence, the reformer which produces an endothermic reaction absorbs heat generated from exothermic reaction of the fuel cell, so that heat deviation depending on the position on the cell module can be reduced, and heat generated in the entire stack can be more precisely controlled. Furthermore, depending on which kind of catalyst is selected and provided in the reformer, the diversity in use of fuel can be provided. Third, in a cell bundle which is manufactured in a predetermined size by mixing and arranging the reformer and the cull tube, a fuel gas flow chamber is formed by ceramic support members interposed between the tubes and sealing portions that are formed on opposite sides of each vertical passage by high-temperature sealers. Furthermore, mechanical strength between the tubes is increased by ceramic spacers provided on an electrolyte layer. A reaction portion that is provided in a medial portion of the tube and the opposite ends of the tube are thermally insulated from each other by an insulator. Electrical connectors provided on the opposite ends of the cell tube are directly electrically connected to fuel gas inlet and outlet manifolds, so a problem of corrosion attributable to oxygen can be prevented. Fourth, when a stack module is manufactured by arranging the cell bundles upward, downward, leftward and rightward, a hot box is disposed in a central portion of the stack module, and the manifolds provided on the opposite ends of each cell bundle are supported in corresponding open boxes of left and right racks. Thus, it is easy to insert each cell bundle into the hot box or pull it out of the hot box. Fuel gas is drawn into each tube, and air is drawn into the hot box disposed in the medial portion of the tube, so that gas is prevented from being undesirably mixed with air. Fifth, a stack bundle which can be expanded two-dimensionally can be manufactured in such a way that fuel gas manifolds of plurality of stack modules are connected to each other and air manifolds are connected to each other. A stack which can be indefinitely expanded three-dimensionally can be manufactured in such a way that a plurality of stack bundles are stacked one on top of another. Sixth, the unit cells in the stack are electrically connected in series-parallel to each other. A ratio of series connection to parallel connection can be adjusted by controlling an electrical connection method between the cell bundles in the stack. The electrical parallel connection makes it possible to expand in the size of the final stack although small cell tubes are used. The electrical series connection makes it possible to construct a high-voltage fuel cell stack. Moreover, because the final stack is modularized by the cell bundles, even if some of the cells malfunction or deteriorate in performance, only the required cells can be replaced with new ones. As such, the present invention provides the improved and advanced solid oxide fuel cell stack and a method of manufacturing the same.

Figure 1:
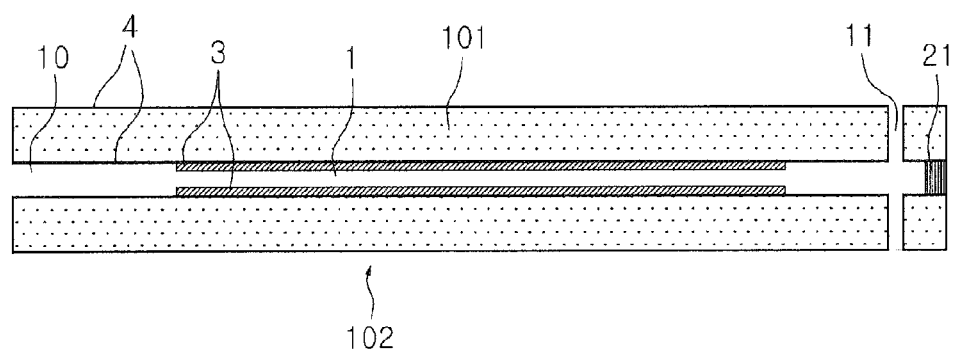
FIG. 1 is a longitudinal vertical sectional view of an internal reformer for solid oxide fuel cells that is manufactured using a tubular support, according to the present invention.

DESCRIPTION OF THE REFERENCE NUMERALS IN THE DRAWINGS 1. fuel gas flow channel in tube
2. air flow channel between tubes
3. reforming catalyst provided in internal channel of tube
4. ceramic dense membrane layer applied to inner and outer surfaces of support for manufacturing reformer
5. hole into which flat tubular reformer tubes or cell tubes are fitted
6. rectangular support plate for supporting flat tubular reformers and segmented cells
7. rectangular ring for supporting single reformer or segmented cell
10. hydrocarbon-containing fuel gas inlet
11. reforming-gas-outlet vertical passage connected to internal channel
12. reforming-gas-inlet vertical passage of cell tube
13. outlet vertical passage of cell tube for primary reaction gas
14. inlet vertical passage of cell tube for secondary reaction gas
15. internal channel for discharge of spent fuel gas
21. ceramic plug for closing internal channel of reformer tube
22. anode layer applied to unit cell
23. electrolyte layer applied to unit cell
24. electrical connector layer applied to unit cell
25. cathode layer applied to unit cell
26. unit integrated cell part in cell tube
27. electrical connector of anode layer provided on left end of cell tube
28. electrical connector of cathode layer provided on right end of cell tube
31. portions formed by primarily grinding support to form protrusions and depressions in support
32. portions formed by secondarily grinding support to remove portions of anode layer after anode layer coating
33. portions formed by tertiarily grinding support to form portions to be coated with electrical connector layers after electrolyte layer coating
41. rectangular ceramic ring or rectangular ceramic support plate disposed on electrolyte layer
42. rectangular ring or rectangular support plate made of heat insulation material
43. rectangular ring or rectangular support plate made of material of sealer
44. rectangular ceramic ring or rectangular ceramic support plate for supporting sealer
45. electrical connection rectangular ring or rectangular support plate for collecting electricity from electrodes provided on opposite ends of tube
51. perforated plate for electricity collection connected to fuel gas manifold
52. fuel gas inlet manifold
53. fuel gas outlet manifold
54. fuel gas flow connection chamber
55. sealer packing part sealed by melting sealer between tubes of cell module
56. ceramic plate for charging space between the fuel gas manifolds
61. open box for mounting fuel gas manifold
62. hot box
63. insulator plate provided on upper and lower surfaces of open box across hot box
64. insulator plug inserted into left or right surface of open box to surface of hot box
65. rectangular ceramic ring closing space between outer surface of open box and manifold
66. air chamber for cooling manifold
67. inlet pipe for supplying cooling air into air chamber
68. outlet pipe for discharging air from air chamber
69. hot box protection steel plate
71. perforated surface for air supply and discharge of hot box
73 perforated plate for air distribution and heat blocking
74. air inlet manifold
75. air outlet manifold
81. fuel gas inlet connection chamber formed by integrating fuel gas inlet manifolds with each other
82. fuel gas outlet connection chamber formed by integrating fuel gas outlet manifolds with each other
83. fuel gas outlet end manifold
84. air inlet connection chamber formed by integrating air inlet manifolds with each other
85. air outlet connection chamber formed by integrating air outlet manifolds with each other
86. fuel gas outlet end manifold
91. electrical connection wire
101. tubular support
102. internal reformer tube manufactured using support
103. segmented cell tube manufactured using support
104a. primary support grinding and anode layer coating
104b. anode layer separation by secondary grinding
104c. electrolyte layer coating
104d. electrolyte layer separation by tertiary grinding
104e. applying electrical connector layer to tertiary ground portion
104f forming cathode layer to be thick
105. cell module
106. cell bundle
107. stack module
108. stack bundle
110. stack

BEST MODE

Hereinafter, a preferred embodiment of the present invention will be described in detail with reference to the attached drawings, but the present invention is not limited to this embodiment.

A support 101 which is used to manufacture a solid oxide fuel cell stack according to the present invention can be made of any material so long as the material is gas-permeable, is a nonconductor and is stable at high temperature. The support 101 can have circular, rectangular or other polygonal cross-sections. At least one fuel gas flow channel is longitudinally formed in the support 101.

A process of manufacturing an internal reformer tube 102 for reaction of reforming hydrocarbon into hydrogen or hydrogen-and-carbon-containing gas will be described. For example, as shown in a vertical longitudinal sectional view of FIG. 1, one end of an internal channel 1 formed in the support 101 is closed by a ceramic substance 21 that contains a binder. At least one vertical passage 11 for discharge of reforming gas is formed in the support 101 at a position adjacent to the end of the internal channel 1 by boring or the like. The vertical passage 11 communicates with the internal channel. Thereafter, the inner and outer surfaces of the support 101 are covered with ceramic material, preferably, electrolyte material, and then sintered at high temperature so that a dense membrane 4 is formed. Subsequently, hydrocarbon reforming catalyst 3 is applied to the entirety or portion of the internal channel 1. The kind of hydrocarbon reforming catalyst 3 or a rate at which hydrocarbon reforming catalyst 3 is applied to the internal channel 1 is appropriately adjusted with respect to the longitudinal direction such that the reforming reaction is gradually progressed.

A process of manufacturing a segmented type cell integrated tube 103a, 103b in which a unit cell for a solid oxide fuel cell is connected in series to the outer surface of the porous support 101 will be explained below. As shown in a vertical longitudinal sectional view of FIG. 2, both ends or one end of the internal channel 1 of the support 101 is closed by a ceramic substance 21 that contains binder. At least one vertical passage 12, 14 for inflow of reforming gas or at least one vertical passage 13 for discharge of reforming gas is formed in the support 101 by boring at a position adjacent to each of both ends or the one end of the internal channel 1. Thereafter, a plurality of unit cells are formed on a medial portion of the outer surface of the support 101 at positions spaced apart from each other at regular intervals. Each unit cell includes an anode 22, an electrolyte 23 and a cathode 25. A conductive electrical connector 24 connects the anode of each unit cell to the cathode of the adjacent unit cell, thus eventually forming an integrated cell part 26 in which the unit cells are electrically connected to each other in series. The anode 22 and cathode 25 of the unit cells disposed on the opposite ends of the support are respectively connected to an electrical anode connector 27 and electrical cathode connector 28 which extend to the opposite ends of the tube. Here, in the cell integrated tube 103b in which the vertical passage is formed in only one end of the tube, the location of the vertical passage may be disposed in the electrical anode connector 27 or electrical cathode connector 28 as necessary.

Figure 2:
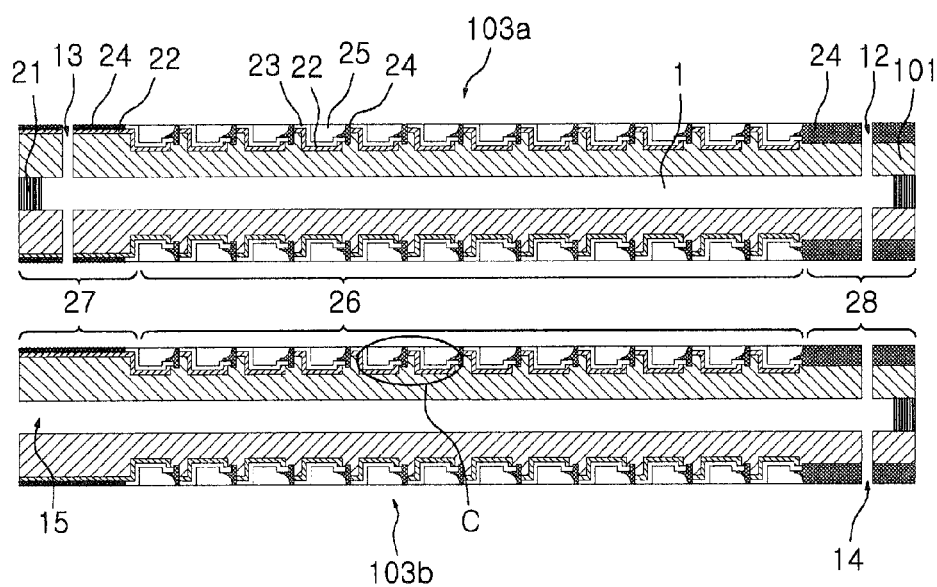
FIG. 2 is a longitudinal sectional view of a segmented cell tube for solid oxide fuel cells that is manufactured using a tubular support and has longitudinal connection unit cells and internal-channel-connected vertical passages, according to the present invention.
Figure 3:
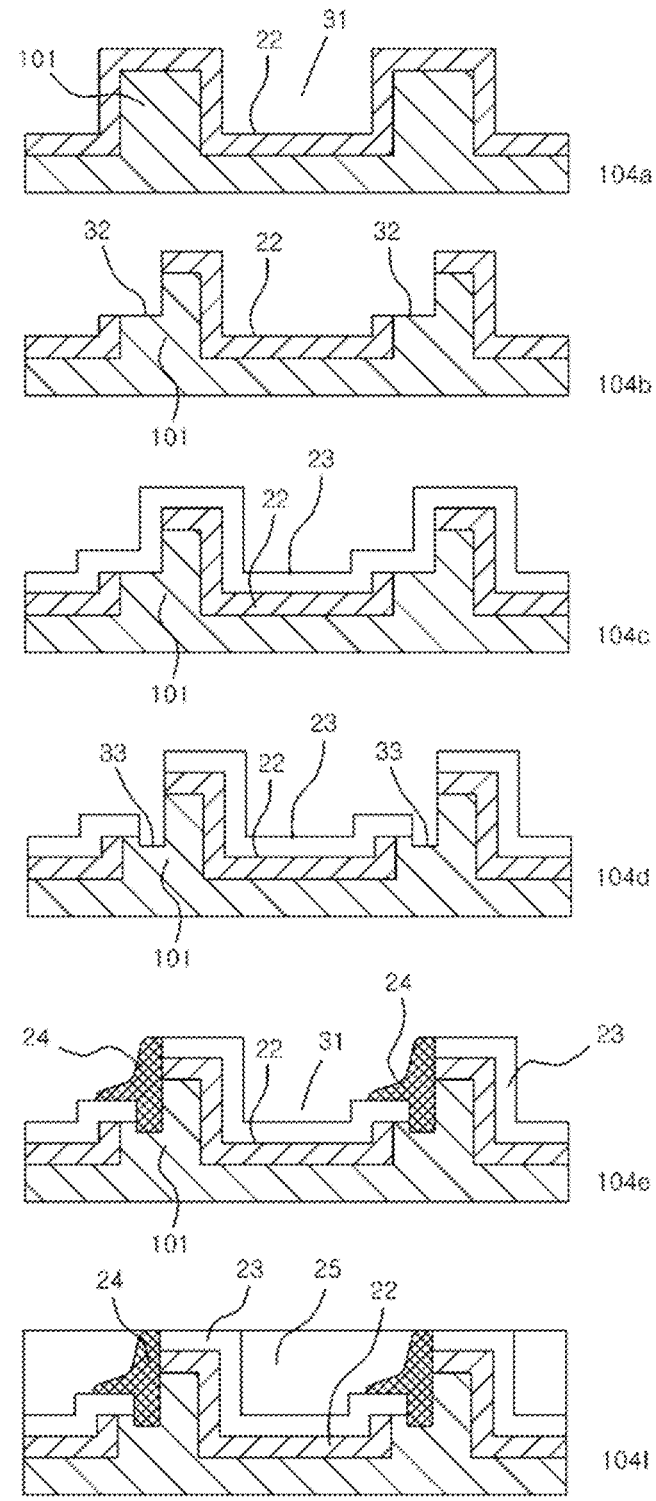
FIG. 3 is of enlarged views showing two unit cells of FIG. 2 to illustrate a process of manufacturing segmented unit cells according to the present invention.

The method of forming the unit cells in the integrated cell part 26 and the method of electrically connecting the unit cells to each other are illustrated in more detail with reference to FIG. 3 that illustrates the method of manufacturing two unit cells of an encircled portion "C" of FIG. 2. Referring to FIG. 3, portions are primarily repeatedly cut out from the outer surface of the support 101 at positions spaced apart from each other at regular intervals to a predetermined length and depth by grinding or the like. For this, after the support has been formed, it is sintered in a temperature range lower than that of a final sintering process, preferably, in a range from 200° C. to 500° C., so that the grinding can be more easily conducted. A cut-out portion 31 is a space in which a cathode layer is eventually formed. The length of the cut-out portion 31 ranges from 5 mm to 50 mm, preferably, from 10 mm to 30 mm. The depth of the cut-out portion 31 ranges from 0.1 mm to 5 mm, preferably, from 0.2 mm to 2 mm. The length and depth of the cut-out portion 31 are determined by a compromise between an increase of the thickness of the cathode layer to reduce resistance and a reduction of it to reduce the material cost. Space between the cut-out portions is required to form an electrical connector layer. The distance between the cut-out portions is 10 mm or less, preferably, 5 mm or less. After the primary grinding process has been completed, the entire surface of the support is covered with an anode layer and temporarily sintered (104a). Here, the anode layer must be comparatively thick to reduce longitudinal resistance. Typically, the thickness of the anode layer is 0.1 mm or more. As necessary, a functional layer for increasing the conductivity is applied to the support before the functional layer is covered with the anode layer. Thereafter, a left portion 32 of each protrusion that has not been ground is secondarily cut out by grinding such that the anode layer and conductive layer of the left portion 32 are removed (104b). Subsequently, an electrolyte layer 23 is applied to the entire portion of the support (104c) and then is sintered. Thereafter, the electrolyte layer of a vertical surface of the protrusion that has not been ground is removed by tertiary-grinding such that the anode layer is exposed to the outside (104d). An electrical connector layer 24 is subsequently applied to the electrolyte-layer-removed portion 33 by spraying or the like such that the electrical connector layer 24 overlaps the electrolyte layers of the left and right unit cells. To form the dense membrane on the electrolyte layer 23 and the electrical connector layer 24, the support is sintered at high temperature (104e). Thereafter, the cut-out portion 31 that is formed by the primary grinding is filled with a cathode layer 25 such that the cathode layer 25 is thick and is connected to the right electrical connector. Subsequently, the support is sintered, thus finally completing a unit cell integration layer (104f). Here, the formation of the electrical connector layer is realized in such a way that wet-coating is conducted and then co-sintering with the electrolyte layer is performed or, alternatively, the dense membrane may be directly formed by dry-coating such as by plasma spray or physical vapor deposition.

Figure 4:
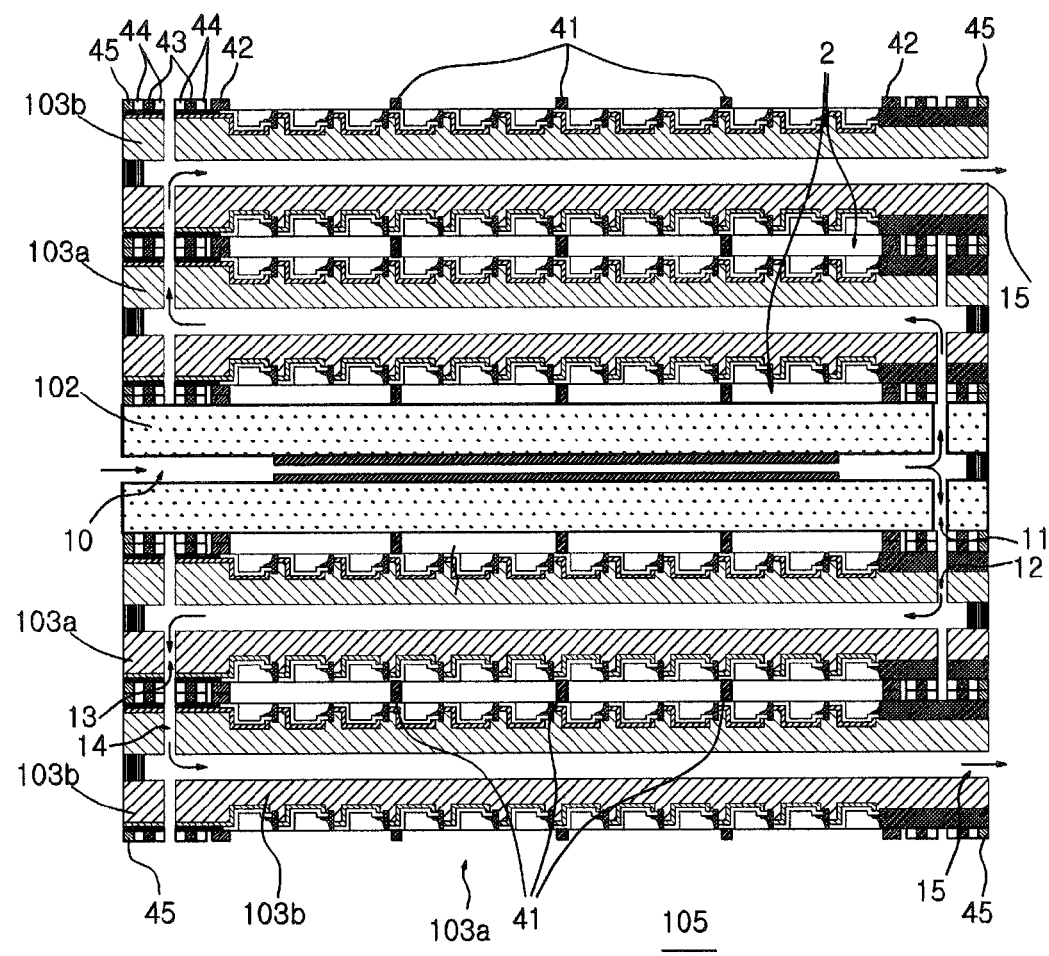
FIG. 4 is a longitudinal sectional view of a unit cell module for solid oxide fuel cells in which two segmented cell tubes are arranged on each of upper and lower sides of a single reformer tube in such a way that the unit cells are connected in series-parallel to each other.
Figure 5:
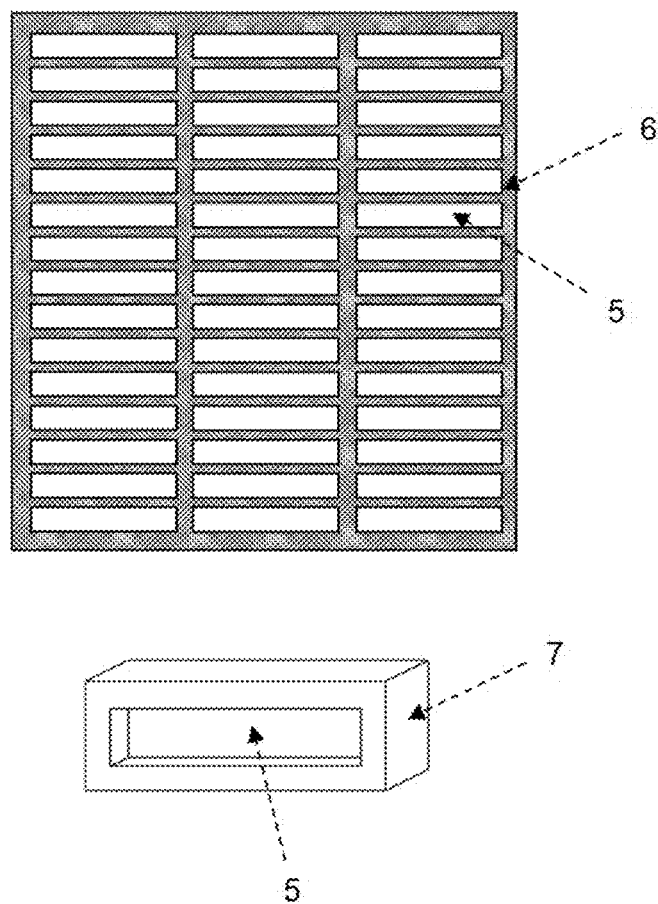
FIG. 5 illustrates a rectangular support plate and a rectangular ring which is used to install tubes which form a cell module or cell bundle in such a way that reformer tubes and segmented cell tubes are arranged upward, downward, leftward and rightward, according to the present invention.

FIG. 4 is a vertical longitudinal sectional view illustrating a single cell module 105 in which two flat tubular cell tubes 103a and 103b that have the same shape are arranged in each of upper and lower sides or each of upper, lower, left and right sides of the flat tubular reformer tube 102 at positions spaced apart from it by predetermined distances. To manufacture the cell module 105, as shown in FIG. 5, a rectangular support plate 6 which has slots 5 into which a plurality of tubes can be inserted or a rectangular ring 7 which has a slot 5 into which a single tube can be inserted is used as an auxiliary device. The rectangular support plate 6 or the rectangular ring 7 includes: a ceramic reinforcement member 41 which is interposed between adjacent tubes to enhance the mechanical strength; an insulator 42 which prevents heat transfer between the integrated cell part 26 and the electrical connection layer 27 or 28; sealers 43 which are disposed on left and right sides of each vertical passage; ceramic sealer support members 44 which are disposed on left and right sides of each sealer; and metal electrical connection couplings 45 which are provided on opposite ends of each tube. When necessary, ceramic adhesive or paste may be used to install the reinforcement members 41, the insulators 42 and the sealer support members 44, and conductive metal paste may be used to install the electrical connection couplings 45 so that electrical connection between each tube and the corresponding couplings can be ensured.

Figure 6:
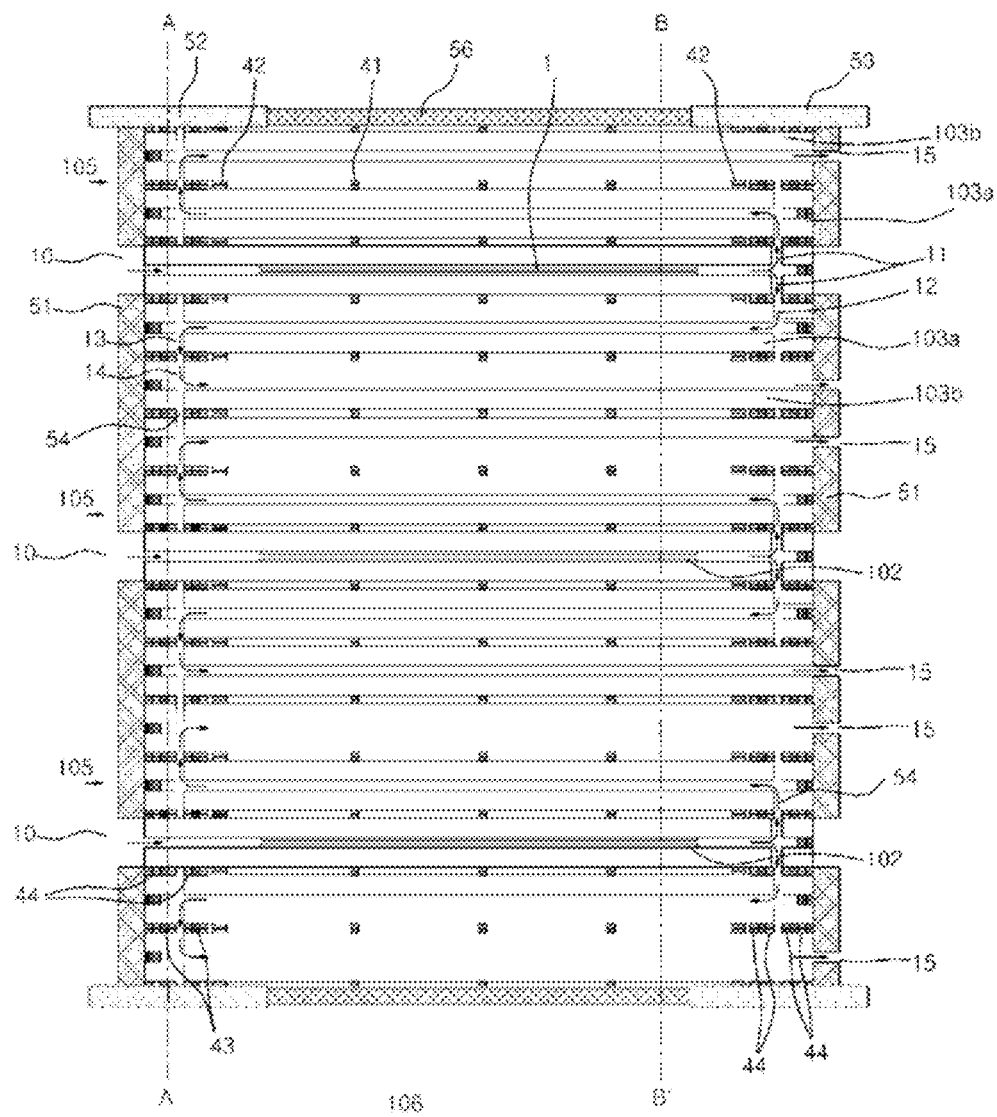
FIG. 6 is a longitudinal sectional view of the cell bundle for solid oxide fuel cells that is configured such that 3×3 cell modules are arranged upward, downward, leftward and rightward, according to the present invention.
Figure 7:
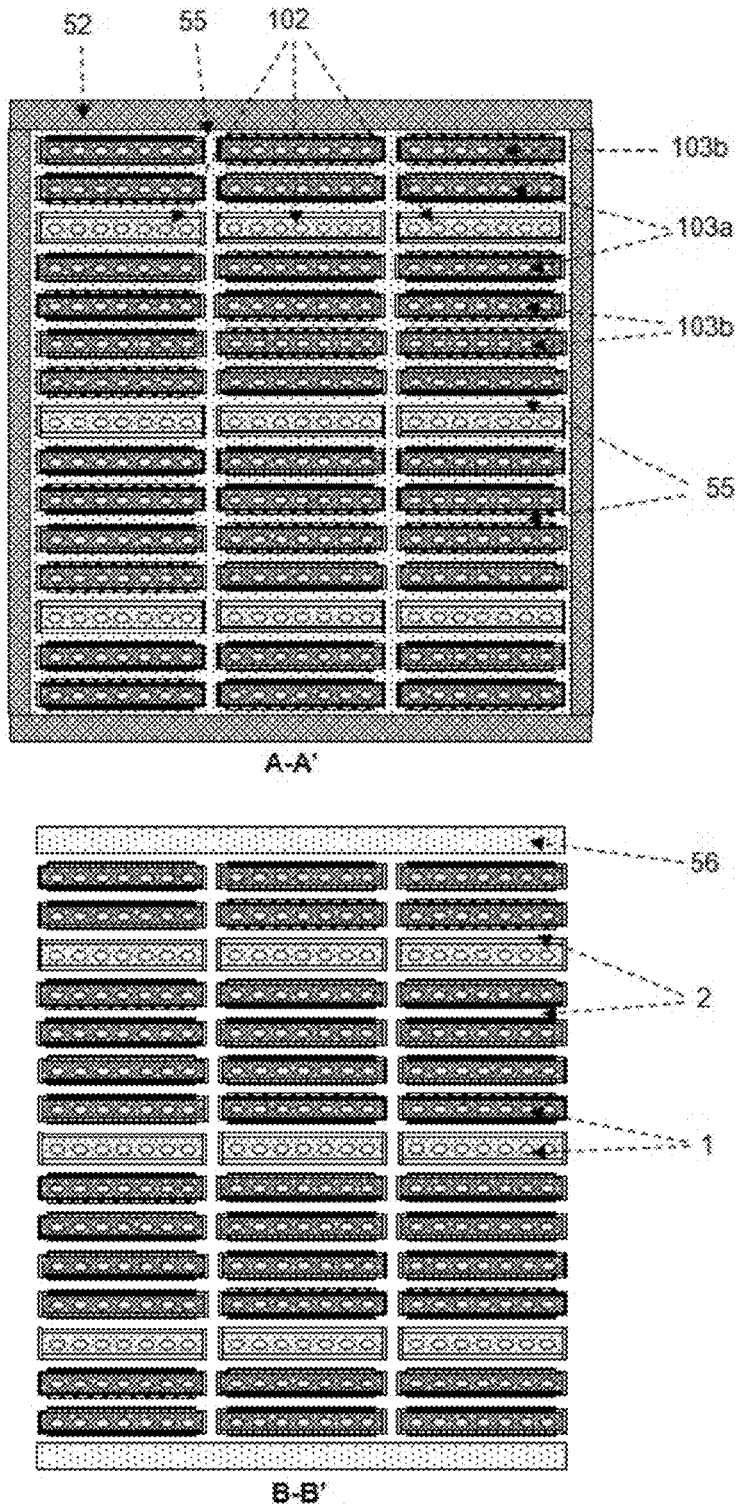
FIG. 7 is of sectional views of the cell bundle taken along line A-A' and B-B' of FIG. 6.

FIG. 6 is a longitudinal sectional view illustrating a cell bundle 106 in which the three cell modules 105 are stacked one on top of another and then three rows of cell modules 105 are arranged in a left-right direction. After 3×3 rows of cell modules are integrated, perforated plates 51 for electrical connection are installed inside respective opposite ends of the cell bundle 106. Fuel gas manifolds 52 and 53 are installed outside the opposite ends of the cell bundle 106. Thereafter, the cell bundle is compressed inward in the longitudinal direction so that the electrical connection couplings 45 provided on the opposite ends of the tubes are electrically connected to the perforated plates, thus completing the electrical connection. For this, more preferably, the coupling 45 has a ring shape and is fitted over each of the opposite ends of the tubes in such a way that each end of the tube is surrounded by the coupling 45. Thereafter, the cell bundle is placed upright, and manifold portions of the opposite ends of the cell bundle are heated at high temperature so that the sealers can be melted into liquid form. The liquid-phase sealer densely seals remains and spreads into space between the sealer support members 44 without leaking out downward and densely seals the space, thus forming a packing 55, as shown in the A-A' sectional view of FIG. 7. In the cell bundle that has been sealed in the above-mentioned manner, chambers 54 which are insulated from the outside are defined by left and right sealed portions that include the vertical passages formed in the opposite ends of the tubes. The fuel gas that flows through the vertical passages flows between the tubes through the chambers 54. In detail, hydrocarbon-containing gas flows into the fuel gas inlet manifold 52 of the cell bundle and passes through inlet 10 of each reformer tube 102, as shown in FIG. 6. Thereafter, the hydrocarbon-containing gas is reformed into hydrogen-containing gas while passing through the internal channel 1. Subsequently, the gas passes through the outlet vertical passage 11 and flows into the inlet vertical passage 12 of the adjacent cell tube 103a. The gas thereafter passes through the corresponding internal channel 1 and goes out through the outlet vertical passage 13 that is disposed at the opposite side. This gas flows into the inlet vertical passage 14 of the adjacent cell tube 103b and passes through the corresponding internal channel before being discharged through the outlet 15 that is disposed at the opposite side of the inlet 10 of the reformer. The gas is finally discharged out of the cell bundle through the fuel gas outlet manifold 53. As shown in the B-B' sectional view of the integrated cell part of FIG. 7, air is drawn into and discharged from the cell bundle in the left-right direction of the drawing along spaces 2 that are defined between the tubes in the longitudinal and lateral directions of the tubes.

Figure 8:
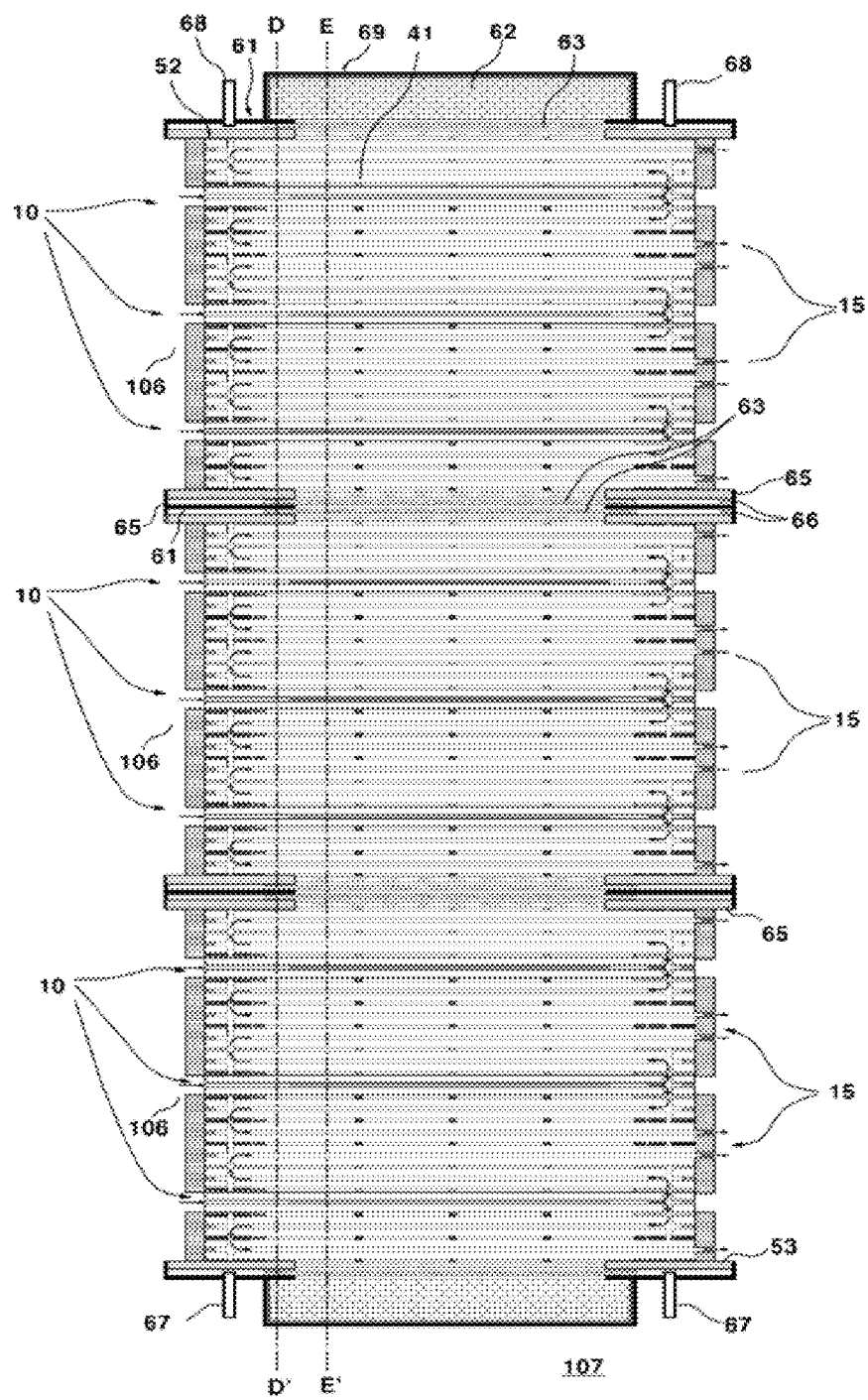
FIG. 8 is a longitudinal sectional view of a solid oxide fuel cell stack that is manufactured such that 3×3 cell bundles are arranged on the racks at positions spaced apart from each other at regular intervals, according to the present invention.
Figure 9:
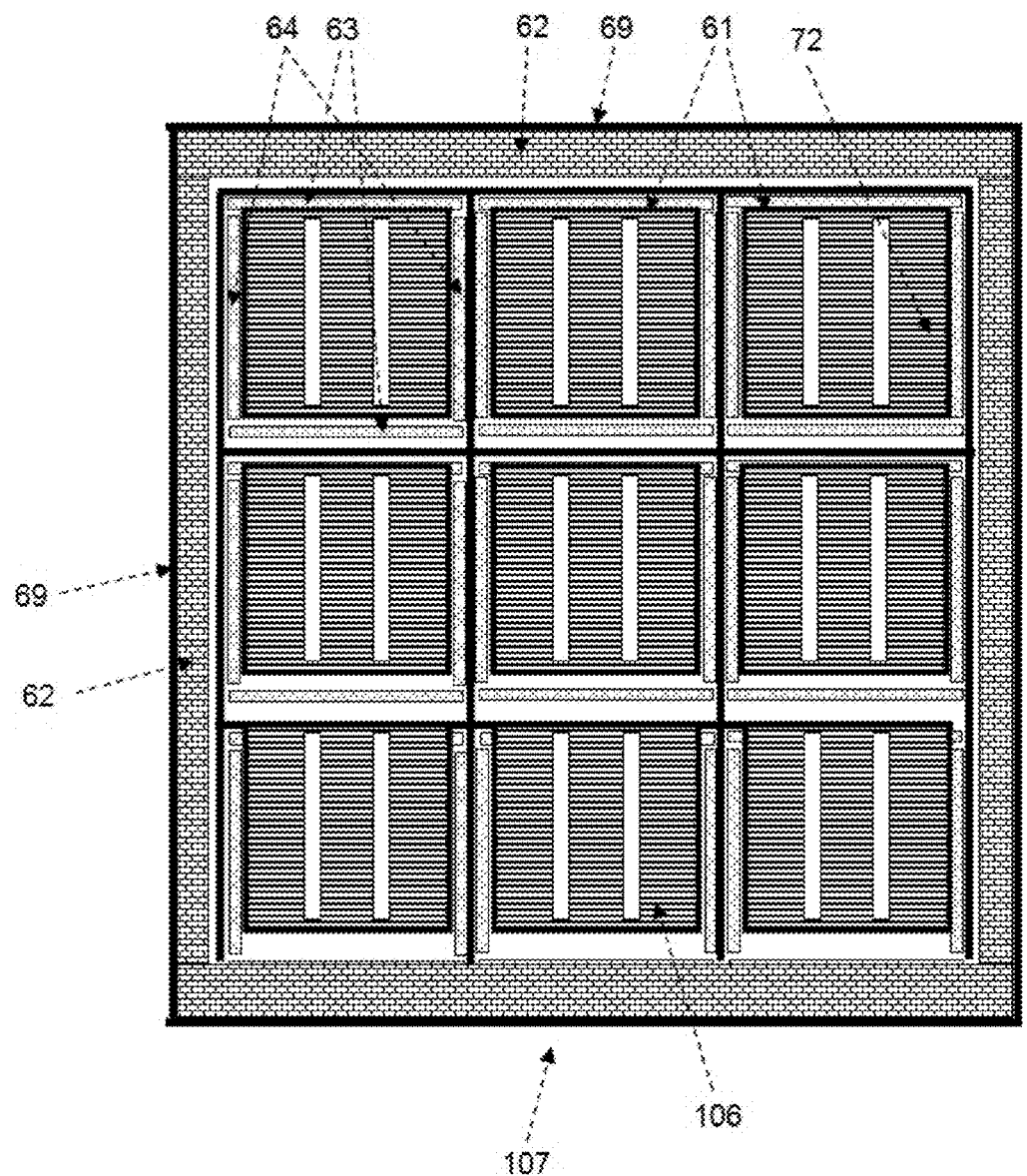
FIG. 9 is a sectional view of the solid oxide fuel cell stack module taken along line D-D' of FIG. 8.
Figure 10:
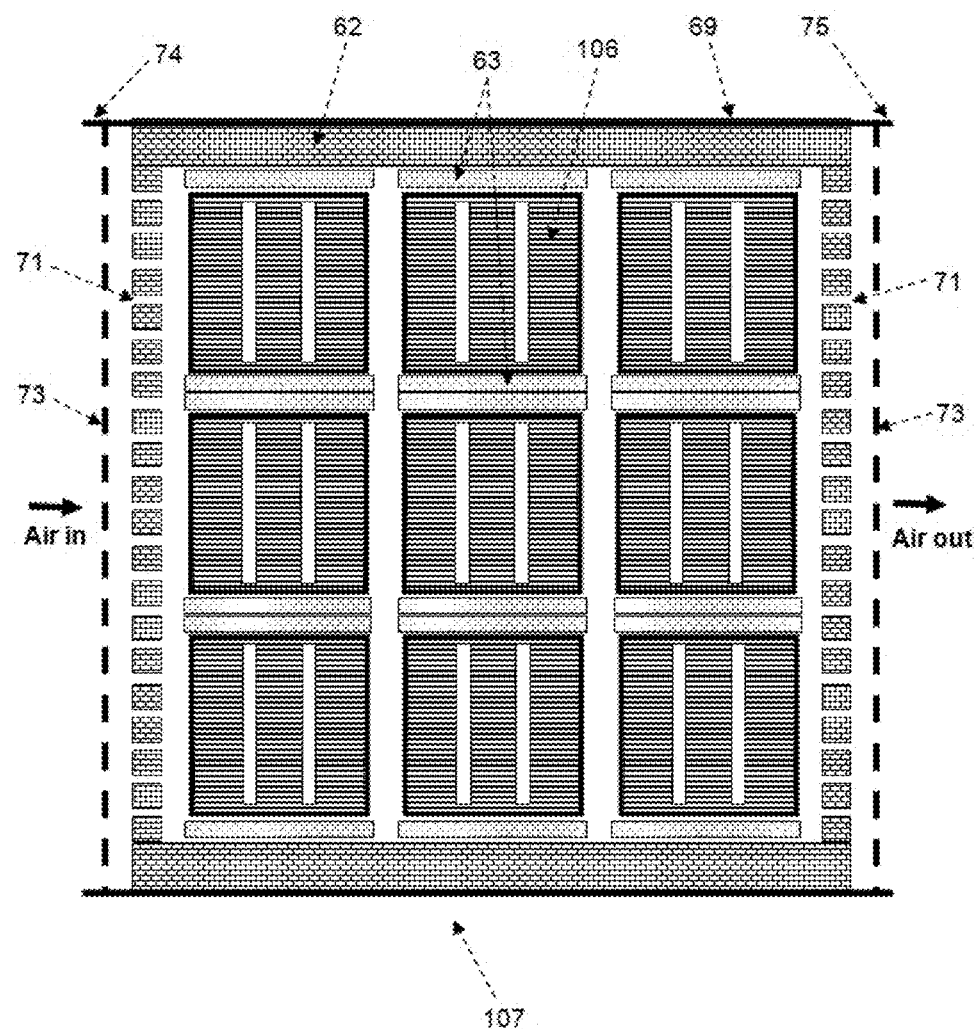
FIG. 10 is a partial sectional view of the solid oxide fuel cell stack module taken along line E-E' of FIG. 8.

FIG. 8 is a vertical longitudinal sectional view illustrating an example of a stack module 107 in which 3×3 rows of cell bundles 106 are arranged in the upward, downward, leftward and rightward directions. FIGS. 9 and 10 are respectively sectional views taken along lines D-D' and E-E' of FIG. 8. To facilitate insertion of each cell bundle from the stack module or removal of it therefrom, a hot box 62 which is disposed at the center of FIG. 8 is provided in a shape in which it has neither left nor right sidewall. Racks are placed at left and right sides of the hot box. In each rack, open boxes 61 each of which is formed of a double-wall and is open on at least left and right side surfaces are regularly arranged. An insulation plate 63 having a predetermined thickness, preferably 5 mm or less, is placed on the bottoms of the left and right open boxes while crossing over the hot box. Here, opposite ends of the insulation plate 63 are disposed on corresponding left and right sidewalls of the hot boxes (for example, the left end of the insulation plate is disposed on a line D-D'). Thereafter, each cell bundle is inserted into the corresponding open box 61 on one side and then installed in the open box 61 on the other side after passing through the hot box. After the installation of the cell bundles has been completed, the insulation plates 63 are installed in corresponding spaces which are formed in the upper ends of the cell bundles 106 and in the open boxes 61, in such a way that the insulation plates 63 cross the hot box. Heat insulation plugs 64 are installed in spaces defined on left and right sides of each open box at positions corresponding to the left and right sidewalls of the hot box, whereby insulation walls are formed in spaces among the cell bundles at the left and right sides of the hot box. Finally, a space between each of the opposite ends of the left and right open boxes 61 and the corresponding manifold 52, 53 is closed by a rectangular ring-shaped ceramic plug 65 so that a single air flow chamber 66 is defined between the open box and the manifold, thus eventually completing the stack module 107. The insulation plates 63 function not only to block heat from the hot boxes but also to close spaces between the upper and lower cell bundles in the hot box so that air is prevented from excessively flowing between the cell bundles. The insulation plates 63 and the insulation plugs 64 have an electrical insulation function that prevents the fuel gas manifolds 52 and 53 and the open boxes 61 from being electrically connected to each other as well as having the heat blocking function. Cooling air is supplied into the air chamber 66 to prevent the sealers in the corresponding cell bundle from melting and leaking out. As shown in the sectional view of FIG. 10, air inlet and outlet manifolds 74 and 75 are provided on the front and rear of the hot box or either upper or lower surface of the hot box. Air flow holes 71 are formed in the sidewalls of the hot box. Preferably, at least one perforated plate 73 is disposed beside each sidewall of the hot box to effectively block heat from the hot box and promote the distribution of air flow. Each cell bundle manifold may be used intact as a fuel gas manifold of the stack module 107. More preferably, the fuel gas manifold may be configured such that the cell bundle manifolds are integrated into a single manifold. In this case, it is preferable that the cell bundles be electrically connected in parallel.

Figure 11:
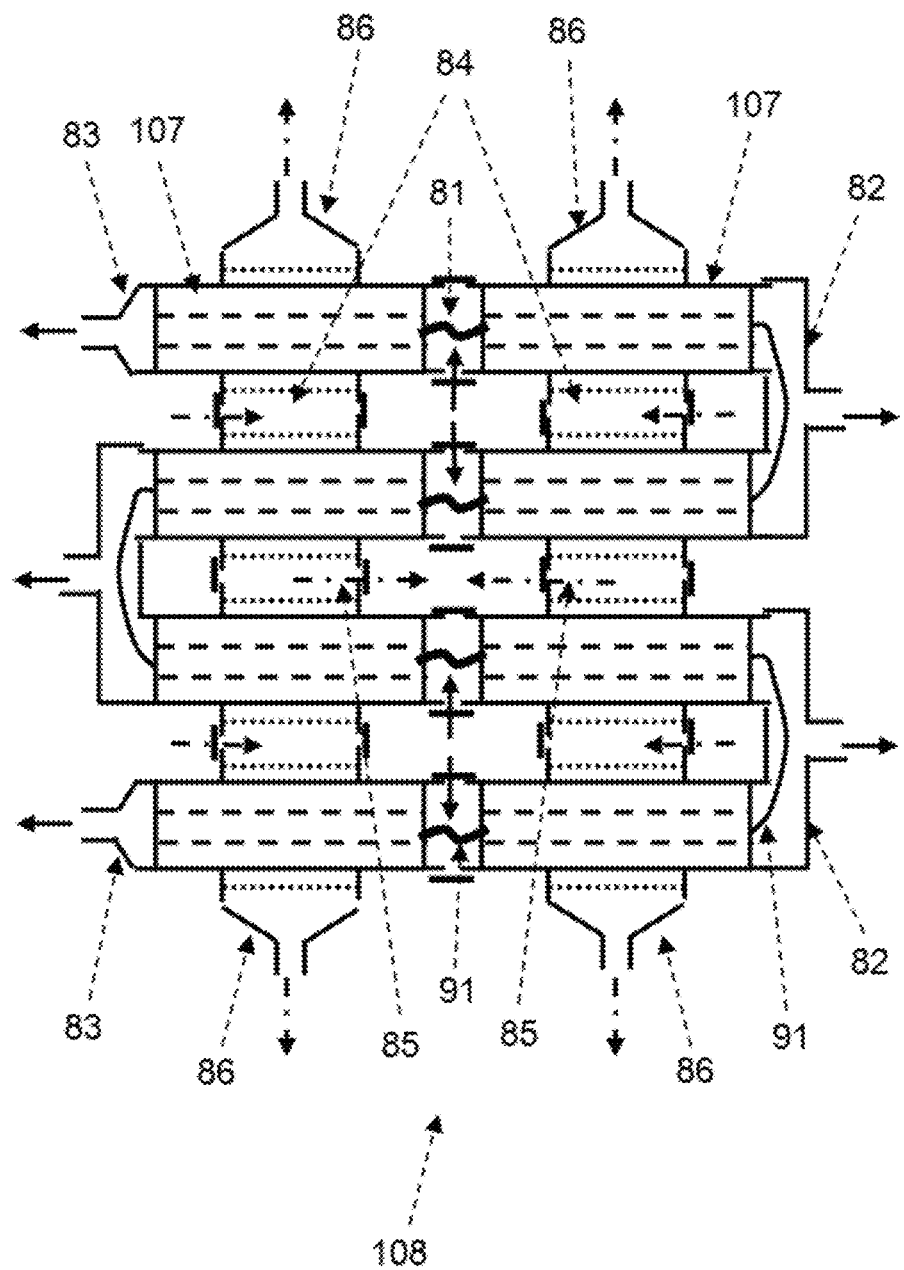
FIG. 11 is a top view of a solid oxide fuel cell stack bundle that is manufactured in such a way that a stack module is formed by connecting two fuel inlet manifolds to each other and four stack modules are connected to each other by connecting air inlet manifolds to each other and connecting air outlet manifolds to each other.

FIG. 11 illustrates a method of constructing a single stack bundle 108 using eight stack modules 107 connected in such a way that a pair of stack modules 107 are connected to each other by connecting their fuel gas manifolds 52 and 53 to each other and then four pairs of stack modules 107 are connected to each other by connecting their air manifolds 74 and 75 to each other. In the connection of the manifolds, the inlet manifolds must be connected to the corresponding inlet manifolds, while the outlet manifolds must be connected to the corresponding outlet manifolds. Exceptionally, the air manifolds may be connected to each other in such a way that the inlet manifolds are connected to the corresponding outlet manifolds. However, this is possible only when the oxygen concentration at the outlet side is too low to affect the fuel cell reaction. Preferably, each manifold connection chamber 81, 82, 84, 85 which connects manifolds to each other is as short as possible within a range in which pipe installation is allowed, so that the entire system can be compact. However, in the case of the fuel gas manifold connection chamber, when two or more manifolds are connected, either the inlet or the outlet manifold that is disposed at the medial position is longer than the tube so that installation or removal of each cell bundle for replacement with a new one can be facilitated. FIG. 11 illustrates an example of the connection among manifolds when nine stack modules are electrically connected to each other in series. Fuel is drawn into the four fuel gas inlet manifold connection chambers 81 which are disposed in the medial portion of the stack bundle and then is discharged therefrom both through the outlet manifold connection chambers 82 which are disposed on the left and right ends of the stack bundle and through the outlet manifolds 83 which are disposed on the left end of the stack bundle. Air is drawn into the four inlet manifold connection chambers 84 which are disposed in the first and third lines and then is discharged both through the two outlet manifold connection chambers 85 which are disposed in the center line and through the four outlet manifolds 86 which are disposed on the opposite sides. In electrical connection between the cell bundles, in this embodiment, the stack modules are placed such that their front and rear parts alternate with each other and the opposite poles thus face each other so that the cell bundles in the stack modules are connected in parallel to each other and the stack modules are connected in series to each other. Thereafter, the stack modules are connected to each other by electrical connectors 91.

Figure 12:
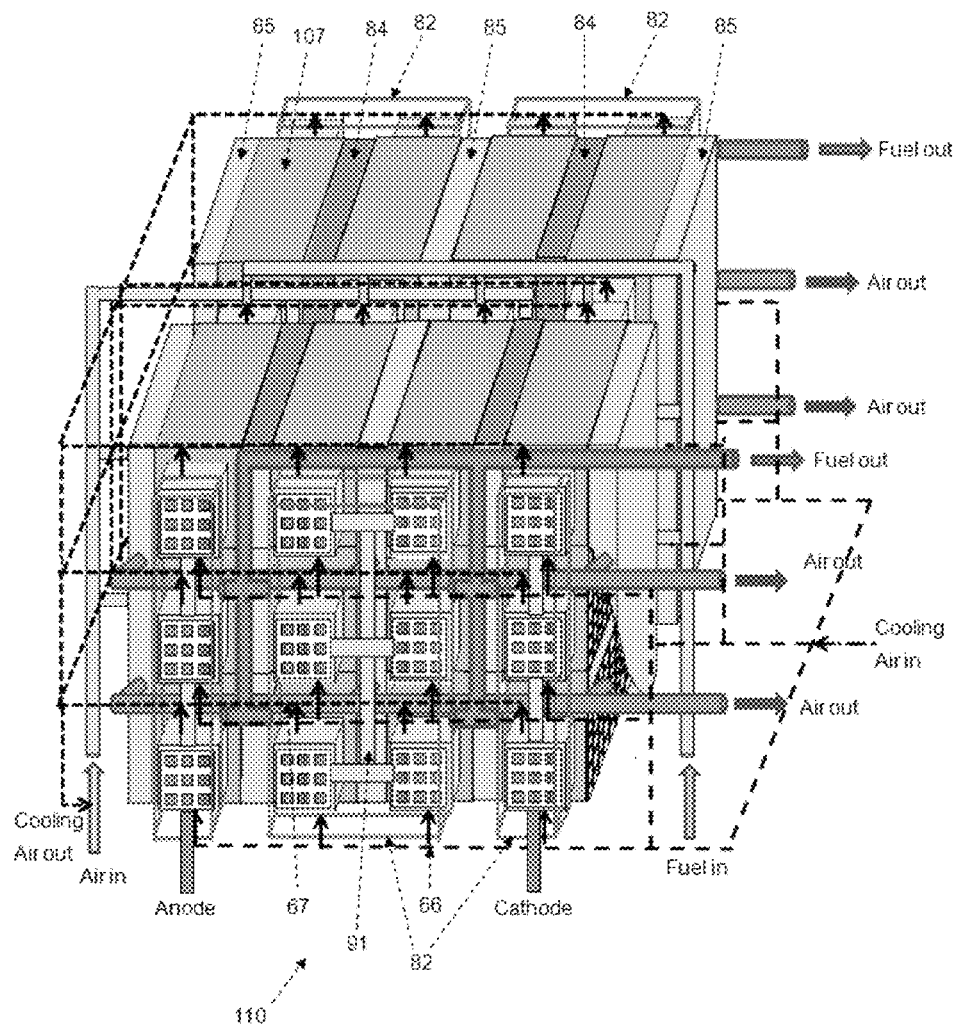
FIG. 12 is a perspective view of a final solid oxide fuel cell stack that is manufactured by vertically arranging three stack bundles of FIG. 11.

FIG. 12 is a perspective view illustrating an example of a stack 110 in which the three stack bundles 108 are placed one on top of another and are electrically connected in parallel to each other. In this example, to electrically connect the stack modules 107 in parallel to each other, the fuel gas manifolds 52 or 53 of the stack module are integrated into a single manifold with respect to the vertical direction. The air manifolds 74 or 75 are also integrated into a single manifold to facilitate the manufacturing process. Preferably, air 68 which is drawn into the air chambers 66 provided on the opposite ends of the stack modules 107 and cools the sealers 43 before being discharged to the outside is mixed with air that is drawn into the air inlet manifolds.

The final stack 110 is compact, and when necessary, in theory, the size of the final stack 110 can be unlimitedly expanded three-dimensionally. More preferably, to facilitate replacement of the cell bundles, the final stack is configured such that only two fuel gas manifolds are connected to each other and the size thereof is expanded as much as desired only in the direction corresponding to the air manifolds and the vertical direction. An expansion in the size of the final stack can be realized although small cell tubes are used. The electrical series and parallel connection among the cell tubes can be easily controlled. Further, replacement of each cell bundles or stack module can be allowed. As such, the present invention provides the solid oxide fuel cell stack which has an improved and advanced structure and the method of manufacturing it.

The conventional fuel cells are mostly configured such that several hundreds of large-scaled unit cells are electrically connected in series to each other and stacked one on top of another to form a single stack. Therefore, in the conventional technique, an increase in voltage is realized by increasing the number of stacked unit cells, and an increase in current is realized by increasing the area of each unit cell. In such a typical series connection stacking method, even if only one unit cell is defective, it affects the entire fuel cell. Thus, zero-defect perfection in the manufacture is required. Furthermore, in the case of the solid oxide fuel cell which must pass through many plastic forming processes due to characteristics of the manufacturing process, it is difficult to increase the area of a ceramic unit cell which is manufactured through a sintering process to have a thickness of 1 mm or less, and it is impossible to perfectly manufacture it without a defect. Thus, the technical completeness is low. Therefore, the present invention can be considered an innovative device which can reliably solve the conventional problems.

For instance, Table 1 shows comparison between a typical planar type solid oxide fuel cell stack in which 200 unit cells each of which has a thickness of 1 mm, a width of 20 cm and a length of 20 cm are stacked one on top of another and provided with metal gas channels having a thickness of 4 mm and a solid oxide fuel cell stack of the present invention where cell tubes, each of which includes a flat tubular support tube having a thickness of 6 mm, a width of 6 cm and a length of 100 cm and 35 integrated cells formed on the support tube, are modularized and arranged by the method of the present invention. In a stack module having a capacity ranging from 20 KW to 40 KW, power density per volume is similar to that of the typical planar type. However, in the case of a MW class high-capacity stack which is manufactured by repeatedly arranging the stack modules, the power density of the present invention is 2.5 times higher than that of the typical planar type. In the typical planar type, it was impossible to manufacture a MW class stack. Moreover, in terms of manufacture of the stack module, in the case of the typical planar type solid oxide fuel cell stack, because all unit cells are connected in series to each other, they must be perfectly manufactured without any defect. However, in the case of the stack module of the present invention, 768 unit cells are electrically connected in parallel to each other. Therefore, even if 76 unit cells of the 760 unit cells have errors during the manufacturing process or malfunction, power of 90% can be still generated. Furthermore, in the final stack, because the 4,608 unit cells are connected in parallel to each other, the possibility of a reduction in the performance of the stack attributable to an error or mistake caused during the manufacturing process can be markedly reduced. Moreover, the present invention is advantageous in that even if any unit cell malfunctions, the stack can be repaired in such a way that a corresponding cell bundle or stack module containing the malfunctioning unit cell can be replaced with a new one.

|  | Item | Planar type | Present invention |
|---|---|---|---|
| Cell | Size (cm) | 0.5 t × 20 W × 30 L[1] | 0.6 t × 6 W × 100 L |
|  | Effective area (cm$^2$) | 19 W × 20 L = 360 | 5 W × 1.5 L × 2 = 15 (2p × 35s)[2] |
|  | Current (W/cm$^2$) | 0.3 at 750° C. | 0.2 at 800° C. |
| Reformer | Size | 0.5 t × 20 W × 20 L | 6 W × 100 L × 0.5 t |
|  | Material | Metal box | Same as cell tube |
| Cell module | Arrangement | 4 cells + 1 reformer | 4 cells + 1 reformer |
|  | Size (cm) | 2.5 t × 20 W × 30 L | 4.0 t × 6 W × 100 L[3] |
|  | Effective area (cm$^2$) | 360 cm$^2$ | 60 cm$^2$ (8p) |
|  | No of stacking | 4s | 35s |
| Cell bundle | Arrangement | — | 10 cell module (3p × 2p) |
|  | Size | | 13.6 H × 13.4 W × 100 L[4] |
|  | Effective area | | 360 cm$^2$ (8 × 6 = 48p) |
| Stack module | Arrangement | 50 cell modules (50s) | 16 cell bundles (4p × 4p) |
|  | Size (cm) | 130 H × 35 W × 45 L[5] | 58.4 H × 57.6 W × 100 L[6] |
|  | Effective area (cm$^2$) | 360 cm$^2$ (1p) | 5,760 cm$^2$ (768p) |
|  | No of stacking | 200s | 35s |

-continued

|  | Item | Planar type | Present invention |
|---|---|---|---|
| Stack bundle | Capacity | 22 KW[7] (107 mW/cm³) | 40 KW[7] (118 mW/cm³) |
|  | Arrangement | 4 stack modules (2p × 2p) | 4 stack modules (2p × 2p) |
|  | Size | 150 H × 90 W × 110 L | 58 H × 200 W × 240 L |
|  | Effective area (cm²) | 1,440 cm² (4p) | 34,560 cm² (4,608p) |
| Final stack | Arrangement | 4 stack bundles (2p × 2p) | 4 stack bundles(4s) |
|  | Size (cm) | 150 H × 240 W × 280 L[8] | 236 H × 200 W × 240 L[9] |
|  | Effective area (cm²) | 5,760 cm² (4p) | 34,560 cm² (4,608p) |
|  | Capacity | 350 KW | 1,000 KW |
|  | Volume density | 34.7 mW/cm³ | 88.3 mW/cm³ |

[1]Include both MEA (0.1t) + bipolar plate with gas channel (0.4t).
[2]Electrical connection: 2 cells in parallel (upper and bottom plate) × 35 cells in series.
[3]The distance between tubes is kept at 2.0 mm.
[4]The wall thickness of the fuel gas manifold is assumed to be 5.0 mm.
[5]The thickness sum of both the inlet and outlet of the fuel or air manifold is considered to be 15 cm.
[6]The distance between cell bundles is kept at 1.0 cm.
[7]Assumed that the unit cell be operated at 0.6 V.
[8]The distance between the stack bundle is considered to be 60 cm for pipe line connections and arrangements.
[9]4 stack bundles were filed vertically with 1 cm distance.

The invention claimed is:

1. An internal reforming solid oxide fuel cell stack, comprising cell modules integrated with each other, each of the cell modules comprising: a tubular reformer having at least one first opening formed in an outer surface of the tubular reformer, the first opening communicating with an internal channel; and at least one tubular reactor having at least one second opening formed in an outer surface of the tubular reactor, the second opening communicating with an internal channel, with a reaction part formed in the tubular reactor, the reaction part comprising unit cells connected in series to each other, wherein an air passage is formed in an outer surface of the tubular reactor, and the first opening and the second opening are connected to each other so that gas that is reformed by the tubular reformer is drawn into the reactor.

2. The solid oxide fuel cell stack according to claim 1, wherein the tubular reformer and the tubular reactor are spaced apart from each other by spacers and are stacked one on top of another, and the first opening and the second opening communicate with each other through a passage formed between the spacers.

3. The solid oxide fuel cell stack according to claim 1, wherein the cell module is configured such that the tubular reformer and the tubular reactor are stacked one on top of another parallel to each other, and a vertical channel is formed in the cell module so that the first opening and second opening are connected to each other by the vertical channel.

4. The solid oxide fuel cell stack according to claim 1, wherein the tubular reformer has inlets on opposite ends thereof, wherein one of the inlets of the tubular reformer is closed, and the first opening is formed adjacent to the closed inlet of the tubular reformer, and the tubular reactor has inlets on opposite ends thereof, wherein one of the inlets of the tubular reactor is closed, and the second opening is formed adjacent to the closed inlet of the tubular reactor.

5. The solid oxide fuel cell stack according to claim 1, wherein each of the unit cells comprises an anode layer, an electrolyte layer and a cathode layer, wherein the anode layer, the electrolyte layer and the cathode layer are applied onto a surface of a depression formed in a support, wherein the cathode layer is disposed at an outermost position and is thicker than the anode layer and the electrolyte layer, respectively, and wherein an electrical connector layer connects the cathode and the anode between the unit cells to each other and is configured such that electric current flows in a direction perpendicular to the electrical connector layer.

6. The solid oxide fuel cell stack according to claim 1, wherein the unit cells of the reaction part are repeatedly formed in depressions between protrusions, and an electrical connector layer is applied to a vertical surface between each of the depressions and the corresponding protrusion such that the electrical connector layer overlaps the electrolyte layers of the adjacent left and right unit cells, and the anode layer of one unit cell extends to the protrusion and is perpendicularly connected to a first side of the electrical connector layer, while the cathode layer of the adjacent unit cell is perpendicularly connected to a second side of the electrical connector layer.

7. The solid oxide fuel cell stack according to claim 1, wherein the reaction part is formed in a medial portion of the outer surface of the tubular reactor, and an electrical connector is connected to each of the anode and cathode disposed on left and right ends of the reaction part.

8. The solid oxide fuel cell stack according to claim 1, wherein a ring-shaped electrical connector is provided on an electrical connector layer disposed on each of opposite ends of the tubular reactor.

9. The solid oxide fuel cell stack according to claim 1, wherein the cell module comprises a plurality of cell modules, wherein the cell modules are integrated with each other to form a cell bundle comprising a fuel gas inlet manifold provided adjacent to inlet sides of the tubular reformers and a reaction gas outlet manifold provided adjacent to outlets of the tubular reactors.

10. The solid oxide fuel cell stack according to claim 9, wherein the cell bundles are arranged parallel to each other to form a stack module having an air manifold provided on the air passage of the reaction part between tubes.

11. A method of manufacturing a solid oxide fuel cell stack, comprising: forming a reformer tube by forming a porous tubular support having at least one fuel gas channel formed in a longitudinal direction, closing one end of the internal channel of the support, forming a vertical passage in the support at a position adjacent to the closed end, the vertical passage communicating the internal channel with an outside of the reformer tube, applying a non-porous membrane ceramic layer to an inner and outer surface of the reformer tube, and providing a reforming catalyst in the internal channel;

manufacturing a segmented type cell tube in which unit cells are repeatedly formed in a medial portion of an outer surface of the tubular support in a longitudinal direction such that opposite poles of the unit cells are electrically connected in series to each other, electrical connectors are connected to a cathode and anode of the unit cells disposed on the opposite ends of the cell tube and extend the electrical connectors to the corresponding ends of the cell tube, at least one end of an internal channel is closed, and a vertical passage is formed in the cell tube at a position adjacent to the closed end, the vertical passage communicating the internal channel with an outside of the cell tube; and forming a cell module by integrating an even number of cell tubes on upper and lower sides or upper, lower, left and right sides of each reformer tube, wherein a spacer made of ceramic material is fitted over some of the electrolyte layers of the integrated cell part, an insulator is disposed beside each of the unit cells adjacent to the ends of the cell tube, a sealing spacer made of a combination of three members having a ceramic substance, a sealer, a ceramic substance is disposed at each of opposite left and right sides of each of the vertical passages, and a metal electrical connector is fitted over each of the opposite ends of the cell tube and the reformer tube.

12. The method of manufacturing the solid oxide fuel cell stack according to claim 11, wherein the cell module comprises a plurality of cell modules, the method further comprising:

forming a cell bundle by closely arranging the cell modules upward, downward, leftward and rightward, and mounting a fuel gas inlet manifold and a reaction gas outlet manifold on respective opposite ends of the cell bundle in such a way that the fuel gas inlet and reaction gas outlet manifolds are connected to the electrical connectors provided on the ends of the cell tubes and the reformer tubes; and melting the sealers so that a fuel gas flow connection chamber is formed by the vertical passages and by space between the left and right sealers, thus completing the cell bundle.

13. The method of manufacturing the solid oxide fuel cell stack according to claim 12, wherein the cell bundle comprises a plurality of cell bundles, the method comprising:

forming a stack module by arranging the cell bundles upward, downward, leftward and rightward at positions spaced apart from each other at predetermined intervals such that the cell bundles are prevented from being electrically connected to each other, wherein a central reaction part of the stack module is installed in a hot box, and the fuel gas manifolds are supported on racks disposed outside the hot box, and the stack module comprises a plurality of stack modules;

forming a stack bundle by connecting the stack modules to each other in such a way that air manifolds of the stack modules are connected to each other on the hot boxes and the fuel gas manifolds of the stack modules are connected to each other on the ends of the cell tubes and the reformer tubes, wherein the stack bundle is able to be two-dimensionally expanded in size and comprises a plurality of stack bundles; and forming a final stack by closely arranging the stack bundles upward and downward, wherein the final stack is able to be three-dimensionally expanded in size.

14. The method of manufacturing the solid oxide fuel cell stack according to claim 11, wherein the ceramic material applied to the inner and outer surface of the reformer that is manufactured using the porous support is prevented from being activated by a reforming reaction of hydrocarbon, and the non-porous membrane is formed by sintering at temperature lower than a temperature at which the support is sintered, or the support is manufactured without any pores.

15. The method of manufacturing the solid oxide fuel cell stack according to claim 11, wherein a catalyst is applied to the inner surface of the reformer, wherein a composition or amount of the catalyst varies from a first end thereof to a second end with respect to a longitudinal direction of a reactor.

16. The method of manufacturing the solid oxide fuel cell stack according to claim 11, wherein forming a reaction part having integrated unit cells comprises: forming a plurality of depressions in a medial portion of an outer surface of a reactor tube at positions spaced apart from each other in a longitudinal direction at regular intervals by grinding to a predetermined depth and width; applying an anode layer to the outer surface of the cell tube; removing a portion of the anode layer by grinding; applying an electrolyte layer thereto; grinding a portion of the electrolyte layer such that the anode layer is exposed; applying an electrical connector layer thereto so that the electrical connector layer is connected to a cathode layer formed in the depressions.

17. The method of manufacturing the solid oxide fuel cell stack according to claim 11, wherein when the support is temporarily sintered after the support is formed and covered with the layers, the support is sintered at a temperature lower than, by from 200° C. to 500° C., a temperature at which the final non-porous membrane is sintered, so that the support can be easily ground.

18. The method of manufacturing the solid oxide fuel cell stack according to claim 16, wherein a length of each of the depressions of the unit cell forming portion ranges from 5 mm to 50 mm, a depth thereof ranges from 0.1 mm to 5 mm, and a distance between the depressions is 10 mm or less.

19. The method of manufacturing the solid oxide fuel cell stack according to claim 16, wherein after a primary grinding process is completed, the anode layer is applied to an entire portion of the integrated cell part and temporarily sintered, a portion of a part that has not been ground during the primary grinding process is secondarily ground to remove a portion of the anode layer, an electrolyte layer is applied to the entire portion and temporarily sintered, a portion of a side portion that has not been ground is tertiarily ground such that the anode layer and the support are exposed with respect to a direction perpendicular to the longitudinal direction, an electrical connector layer is applied to the exposed portion and sintered at high temperature so that the electrical connector layer along with the electrolyte is formed into a non-porous membrane, and a cathode material is charged into the depressions formed by the primary grinding process such that the cathode material is connected to the electrical connector layer and then sintered, thus completing the integrated part in which the unit cells are connected to each other in series.

20. The method of manufacturing the solid oxide fuel cell stack according to claim 11, wherein the anode layer is formed in such a way that a metal layer or high metal content functional layer that is higher in conductivity than the anode layer is applied to the cell tube before the anode layer is applied on the metal layer or functional layer, whereby an electrical resistance of the anode layer is reduced.

21. A solid oxide fuel cell stack, comprising:

a reformer tube comprising: a porous tubular support having at least one internal channel extending in a longitudinal direction, the internal channel being closed on one end thereof, with a vertical passage formed in the porous tubular support at a position adjacent to the closed end, the vertical passage communicating the internal channel with an outside of the reformer tube; a non-porous membrane ceramic layer formed on an inner and outer surface of the porous tubular support; and a reforming catalyst provided in the internal channel; and a reactor tube comprising at least one integrated cell part formed on a medial portion of an outer surface of a porous tubular support having at least one internal channel extending in a longitudinal direction, with unit cells repeatedly formed on the integrated cell part at positions spaced apart from each other in the longitudinal direction in such a way that opposite poles of the unit cells are electrically connected in series to each other, wherein a cathode end and an anode end formed on opposite ends of the reactor tube are formed by connecting electrical connectors to cathode and anode of leftmost and rightmost unit cells and extending the electrical connectors to the corresponding ends of the reactor tube, at least one end of the internal channel of the porous tubular support is closed, and a vertical passage is formed in the porous tubular support at a position adjacent to the closed end, the vertical passage communicating the internal channel with an outside of the reactor tube, wherein the reformer tube comprises a plurality of reformer tubes and the reactor tube comprises a plurality of reactor tubes, and an even number of reactor tubes are disposed at upper and lower sides or upper, lower, left and right sides of each of the reformer tubes and inserted into a rectangular support plate having a plurality of tube support holes, or a rectangular tube coupling ring is fitted over each of the reformer tubes and reactor tubes so that the tubes are closely arranged using the rectangular tube coupling rings, wherein a cell module is manufactured in such a way that the support plate or ring made of ceramic material is fitted over some of the electrolyte layers of the integrated cell part, an insulator is disposed beside each of the leftmost and rightmost unit cells, a combination of three members having a ceramic substance, a sealer, a ceramic substance is disposed at each of opposite left and right sides of each of the vertical passages, and a fuel gas flow passage is formed between the sealers, and the cell module comprises a plurality of cell modules, a cell bundle is manufactured in such a way that the cell modules are closely arranged upward, downward, leftward and rightward, and a fuel gas inlet manifold and a fuel gas outlet manifolds are connected to respective opposite ends of the cell bundle, and the cell bundle comprises a plurality of cell bundles, a stack module is manufactured in such a way that the cell bundles are arranged upward, downward, leftward and rightward at positions spaced apart from each other at predetermined distances such that the cell bundles are prevented from being electrically connected to each other, and a medial reaction part of the stack module is disposed in a hot box, and fuel gas manifolds provided on opposite ends of the stack module are provided on racks disposed outside the hot box, and the stack module comprises a plurality of stack modules, and a final stack is manufactured in such a way that the stack modules are closely arranged upward and downward by connecting air manifolds to each other on the hot box and connecting the fuel gas manifolds of the stack modules to each other on the ends of the reformer tubes and the reactor tubes.

* * * * *